(12) United States Patent
Escobar Barrios et al.

(10) Patent No.: US 9,631,078 B2
(45) Date of Patent: Apr. 25, 2017

(54) COMPATIBILIZER BASED ON INTERPENETRATING POLYMER NETWORKS (IPN) FOR RECYCLING POLYMER BLENDS

(71) Applicants: Vladimir Alonso Escobar Barrios, San Luis Potosi (MX); Karen Mariana Mancera Garcia, Guanajuato (MX)

(72) Inventors: Vladimir Alonso Escobar Barrios, San Luis Potosi (MX); Karen Mariana Mancera Garcia, Guanajuato (MX)

(73) Assignee: Instituto Potosino de Investigación Científica y Tecnológica A.C., San Luis Potosi (MX)

( * ) Notice: Subject to any disclaimer, the term of this patent is extended or adjusted under 35 U.S.C. 154(b) by 204 days.

(21) Appl. No.: 14/178,318

(22) Filed: Feb. 12, 2014

(65) Prior Publication Data

US 2015/0225562 A1    Aug. 13, 2015
US 2017/0088703 A9    Mar. 30, 2017

Related U.S. Application Data

(60) Provisional application No. 61/763,686, filed on Feb. 12, 2013.

(51) Int. Cl.
*C08L 33/02* (2006.01)
*C08L 23/08* (2006.01)

(52) U.S. Cl.
CPC ....... *C08L 23/0815* (2013.01); *C08L 2205/04* (2013.01)

(58) Field of Classification Search
CPC ...... C08L 23/00; C08L 23/0869; C08L 23/16; C08L 25/08; C08L 25/18; C08L 29/04; C08L 31/04; C08L 31/02; C08L 33/02; C08L 33/20; C08L 33/26; C08L 67/00; C08L 75/00; C08L 79/08; C08L 2205/03; C08L 2205/04
See application file for complete search history.

(56) References Cited

U.S. PATENT DOCUMENTS

| 4,468,499 A * | 8/1984 | Siegfried et al. ............. 525/301 |
| 7,901,595 B2 * | 3/2011 | Vilkman et al. ............. 252/511 |
| 2007/0193120 A1 * | 8/2007 | Tessier et al. ............... 49/490.1 |

FOREIGN PATENT DOCUMENTS

WO    WO 2008052568 A1 *  5/2008  ............... C08J 7/16

OTHER PUBLICATIONS

Jiménez, M.a. et al. Latin American Applied Research vol. 39 pp. 131-136 published Jun. 2009.*
Kong, X. et al. Biomacromolecules vol. 9 pp. 2221-2229 published Jul. 2008.*

* cited by examiner

*Primary Examiner* — Irina S Zemel
*Assistant Examiner* — Jeffrey Lenihan
(74) *Attorney, Agent, or Firm* — Defillo & Associates; Evelyn A. Defillo

(57) ABSTRACT

A compatibilizer including a thermoplastic elastomer and an acrylic polymer. The thermoplastic elastomer and the acrylic polymer form an interpenetrating polymeric network.

6 Claims, 11 Drawing Sheets

COMPATIBILIZER BASED ON INTERPENETRATING POLYMER NETWORKS (IPN) FOR RECYCLING POLYMER BLENDS

CROSS-REFERENCE TO RELATED APPLICATIONS

This application claims the benefit of priority to U.S. Provisional Application No. 61/763,686 filed Feb. 12, 2013, the contents of which are incorporated herein by reference.

FIELD OF THE INVENTION

A new compatibilizer based on an interpenetrating polymer network (IPN) was synthesized composed by a thermoplastic elastomer (TPE) and certain polymer based on carboxylic acids. The compatibilizer is useful in blends of certain polymers for their recycling.

BACKGROUND OF THE INVENTION

Nowadays, the plastics are the most commonly used materials and the main reason is their versatility for many applications, which have allowed replacing, partly or completely, materials such as steel, glass, wood, aluminum, among others. According to the study "Analysis of production, demand and recovery of plastics" by the Association of Plastics Manufacturers (EuPR), from 1950 to 2010, in the world, the average annual increment in the production of plastics materials has been of 9%, as a consequence of a continuous innovation. According to Subramanian (Subramanian P. M. (2000). Plastics recycling and waste management in the US. Resources, Conservation and Recycling 28: 253-263), the polymers with higher consumption are: Low density polyethylene (LDPE), high density polyethylene (HDPE), polypropylene (PP) and poly (ethylene terephthalate) (PET).

The blend of wasted polymers such as PET and polyolefins (polyethylene and polypropylene), may provide an alternative route for the production of recycled materials with satisfactory costs, good yields and wider application potential. Nevertheless, one of the drawbacks for blends of PET and polyethylene is that they are thermodynamically immiscible, so the blends exhibit a coarse morphology giving very poor mechanical properties. Furthermore, due to the chemical structure of polyethylene (PE), which lacks of functional groups, it is difficult to interact with most of polymeric materials. Good blends with these polymers can be achieved by appropriate methods of compatibilization and processing technologies by improving interfacial adhesion and dispersion in blends. Thus, a composite material with better thermal and mechanical properties compared to the starting polymers can be obtained.

The compatibility of immiscible blends can be improved by one of the following ways:

The addition of a third component having a segment that is able to have a specific interaction and/or chemical reaction with the components of the blend (for example, block or graft copolymers).

In the case of PET, mixing it with suitable functionalized polymers capable of carrying out a chemical reaction with the functional group of the polyester.

Torres disclosed in 2001 (Torres N, Robin J J, Boutevin B (2001). Chemical modification of virgin and recycled poly(ethylene terephthalate) by adding of chain extenders during processing. J App Polym Sci 81: 2377-2386), that synthesis of functionalized polyolefins GMA by copolymerization in solution is relatively expensive to be used for large amounts in products such as blends of HDPE/PET. Studies by Champagne (1999) (Champagne M F, Huneault M A, Row C, Peyrel W (1999). Reactive compatibilization of polypropylene/polyethylene terephthalate blends. Polym Eng Sci. 39: 976-984), reported that the use of maleic resins do not provide good adhesion between the PE and PET. However, other investigations have shown better adhesion between the two phases of immiscible blends of PET/PE giving an increase with respect to the reference blend by using maleic anhydride grafted polyethylene.

Currently, there are different types of commercial compatibilizers like random polymers, block copolymers, grafted polymers and functionalized polymers. The most used compatibilizers are polyolefins grafted with maleic anhydride (MA) like PE-g-MA. Other commonly used compatibilizers are block polymers include styrene-ethylene/butylene-styrene (SEBS), ethylene vinyl acetate (EVA), to compatibilize blends of polyethylene/polycarbonate.

Nowadays, the majority of the research done on the compatibility of immiscible polymer blends often use compatibilizers based on graft or copolymers type, which usually have a limited number of available functional groups to interact with the polymers of the blend.

The field of the interpenetrated polymer networks (IPN) gained interest since the 70's decade, when they were described for the first time. The most common IPN structures are mainly based on polyurethane (PU), polysiloxanes, polyesters (PEST), epoxy resins, and polyacrylates (PAcr) (Utracki, L. A. *Polymer Blends Handbook*. Dordrecht: Kluwer Academic Publishers, 2002. Chapter 6) In order to have an ideal IPN structure, the components are partially bonded at a molecular scale, so they cannot be split unless the chemical bonds are broken. The crosslinking of every IPN is only controlled by the type and concentration of the employed crosslinking agent. In the case of real IPN structures, it's very unlikely that the A-polymer crosslinks or grafts the B-polymer, due to the preparation method which involves 2 stages (by a free radical polymerization). Crosslinking agents usually have two or more double bonds, so during the second stage of polymerization this double bonds can act as grafting sites (so is the case of the polybutadiene), forming sites in which B-polymer can easily graft; furthermore, if A-polymer has an α-hydrogen (such as polybutylacrylate), it can be displaced to form additional bonds. Nowadays, in many cases (but not in the case of the present invention), a graft site is created in purpose, to improve the blending of B-polymer in A-polymer; this technique is known as reactive compatibilization.

For thermoplastics IPN's, there is physical crosslinking, more than chemical bonding; frequently, the physical crosslinking is based on triblock copolymers, being the TPE the most common choice in addition to ionomers or semicrystalline materials. As examples of this group there are some relevant blends such as ethylene-propylene-diene monomer/polypropylene (EPDM/PP), nitrile butadiene rubber/polyamide (NBR/PA), polyurethane/polyamide (PU/PA), styrene-ethylene-butylene-styrene/polyamide (SEBS/PA), ethylene-propylene-diene/polybuthyleneterephtalate (EPDM/PBT), and epichlorohydrin/polyamide (ECH/PA). Utracki, L. A. *Polymer Blends Handbook*. Dordrecht: Kluwer Academic Publishers, 2002. Chapter 5).

Nishi and Kotaka ((1985) Complex-Forming Poly(oxyethylene):Poly(acrylic acid) Interpenetrating Polymer Networks. Preparation, Structure, and Viscoelastic Properties. Macromolecules, Vol. 18, No. 8, 1985) show that for improving the compatibility of given polymer pairs, various attempts have been made. One such attempt was the introduction of cross-links within each component to prepare interpenetrating polymer networks (IPNs) or semi-interpenetrating polymer networks (SIPNs).

According to the IUPAC, the Interpenetrating polymer network is an intimate combination of two polymers both in network form, at least one of which is synthesized and/or cross-linked in the immediate presence of the other. And the Semi-interpenetrating polymer network is a Combination of two polymers, one cross-linked and one linear, at least one of which was synthesized and/or cross-linked in the immediate presence of the other.

Other TPE with interesting properties, but it has not been widely used is the styrene-ethylene-propylene-styrene tri-block copolymer (SEPS). The SEPS has been used as compatibilizer of polymer blends like Polypropylene/Polystyrene (PP/PS); Polypropylene/High Density Polyethylene (PP/HDPE); and Polypropylene/Polycarbonate/Ethylene-octene copolymer (PP/PC/POE) (Sung-Goo Lee, Jae Heung Lee, Kil-Yeong Choi, John Moon Rhee. 1998. Glass transition behavior of polypropylene/polystyrene/styrene-ethylene-propylene block copolymer blends. Polymer Bulletin 40, 765-771), (Dhibar, A. K. Kim J. K., Khatua B. B. 2011. Cocontinuous Phase Morphology of Asymmetric Compositions of Polypropylene/High-density Polyethylene Blend by the Addition of Clay. Journal of Applied Polymer Science, Vol. 119, 3080-3092) (Dai S., Ye L. 2008. Effect of SEPS as a Novel Compatibilizer on the Properties and Morphology of PP/PC/POE Blends. Journal of Applied Polymer Science, Vol. 108, 3531-3541).

In all these studies, it is important to mention that they consider compatibilizer quantity between 1 to 10% by weight. In addition, in some cases, the SEPS has been used to improve toughness of polymeric materials like PP (Matsuda Y., Hara M., Mano T., Okamoto K. and Ishikawa M. (2005). The Effect of the Volume Fraction of Dispersed Phase on Toughness of Injection Molded Polypropylene Blended With SEBS, SEPS, and SEP. POLYMER ENGINEERING AND SCIENCE, DOI 10.1002/pen.20298)

In the case of the Poly (acrylic acid) (PAA), (Sun J. Y., Hu G. H. and Lambla M. Kotlar H. K. (1996) In situ compatibilization of polypropylene and poly(butylene terephthalate) polymer blends by one-step reactive extrusion. Polymer Vol. 37 No. 18, pp. 4119-4127), showed that the polypropylene/poly(butylene terephthalate) (PP/PBT) blends have been compatibilized by using a one-step reactive extrusion process with the addition of monomer of acrylic acid, which are potentially reactive towards the carboxylic and/or hydroxyl groups at the chain ends of the PBT.

The purpose of compatibilizing a polymer blend is to reduce the interfacial tension between the two phases (A-polymer and B-polymer interface), in order to ease the dispersion, and stabilize the morphology generated when blending and during the following process steps. It's used also to improve the adhesion between both polymers, improving the stress transfer, enhancing the mechanical properties of the final product. The efficiency of the added compatibilizer is determined by its preferential localization in the interphase. The compatibilizer must be designed depending of the polymer blend nature. There are several compatibilization strategies for polymer blends, for example, the most common of them is by means of the addition of a third component which is miscible in both structures (co-solvent). In the case of polyester/polyolefins blends (so is the case of the present invention), and more particularly the case of PET/polyolefins blends, the common solution is to graft polyolefins with maleic anhydride (MA). So, in a general way, there are three compatibilizing methods which may be described as follows:

By the simple addition of a compatibilizing agent (like the Phenoxy™ added for PBT/PMMA blends). It results very useful to identify co-polymers that have certain morphologies capable of establish a co-continuity within the phases of the compatibilized blend, for example the SEBS added to a PP/Polycarbonate (PP/PC) blend.

Reactive compatibilization; in this case, block or graft co-polymers are generated, so they can form chemical bonds through the interphase. Nowadays, this is the most popular method, present in about the 90% of the commercial blends.

Physical compatibilization, in which a fine morphology is generated, and stabilized by nucleation crystallization.

In polymer recycling field there are several "universal compatibilizers" for waste polymers, which are typically multi-component polymers with moieties soluble in some components of the polymeric blend, or in certain cases, the moieties are able to form chemical bonds with them. Due to this universality of these compounds, it is really expensive to employ them. The most common substances employed to modify some polymers are also good compatibilizers which offer a cheaper option for polymer blends. These materials are formulated for specific polymer mixtures, for example Blendex™ (an acrylic based additive, for PEST) which works as a compatibilizer from the polybutadiene family for styrenic resins, PVS, TPU, and PET; or FUSABOND™, a polyolefin modified with MA, employed for PET/polyolefins blends; and finally, Vector™, which is a block copolymer with stabilizers, designed for polyolefins/PS blends. (Utracki, L. A. *Polymer Blends Handbook*. Dordrecht: Kluwer Academic Publishers, 2002. Chapter 16)

Document GB1581167A discloses the synthesis of a composite from thermoplastic resins (PBT and/or polyolefins), blended with a block co-polymer (SEBS for this case), which have an IPN structure. Document CA1111987A1 refers to a polymeric blend comprising a partially hydrogenated block co-polymer with a thermoplastic resin. The partially hydrogenated block copolymer is limited to have two mono alkenyl arene terminal groups, and the intermediate block polymer is a conjugated diene (like S—B—S). The ratio of this composite is: 5-95% wt of the partially hydrogenated block co-polymer, and 95-5% wt of a thermoplastic resin whose melting temperature range is 120-300° C. The particular composite of this example comprises a lineal polyolefin (poly methyl pentene, PMP), and a polyester (PET or PBT), compatibilized by a 40-70% wt of the partially hydrogenated block co-polymer. This composite, in contrast to the present invention, does not have poly acrylic polymer improving the compatibilizer, which forms the IPN structure with the partially block-copolymer of the present invention, in order to achieve the polymer blend.

WO0327366A1 discloses a polymeric fiber which comprises a TPE; the structure comprises a nucleus (which may be any of the following: polyetheramides, polyurethanes, elastomeric polyolefins, polyester, or styrenic TPE), and a disperse phase which is a non-elastomeric thermoplastic polymer (like non-elastomeric polyolefins, polyesters, or polyamides); the ratio of such blends is 10-70% wt of the disperse phase, and 90-30% of the nucleus. The difference between this and the present invention is that, even though the non-elastomeric polymer may be polyethylene or a polyester (such as PET), and that the nucleus may be an styrenic TPE, there is no mention neither about the IPN's structures, nor about poly acrylic acid (PAcr) within the composite.

WO2013075241A1 describes a polyethylene/polypropylene blend (PE/PP), ratio 0.5-0.5% wt, where the polymers form a "droplet-in-droplet" microstructure, best described as one polymer is encapsulated into another polymeric layer, forming layers just like "onion skin-like" structure; this structure is achievable by means of an interfacial agent, which in this case is an EPDM, or any ethylene-propylene co-polymer.

CA1334876C describes that a styrenic co-polymer can modify the mechanical properties of a polymeric blend. Said co-polymer is ethylene-propylene-diene grafted with glycidyl acrylate or glycidyl methacrylate, and the nucleus elastomer has a poly alkyl acrylate linked to the polystyrene structure, all these conforming an IPN structure; the difference between this example and the present invention lies on the fact that in the instant case the polymers comprising the IPN are not grafted, besides the acrylic polymer and the TPE do not have chemical bonds between them, which makes the structure less complex, even to synthetize.

Document CA2029032A1 presents a composite which comprises a thermoplastic resin, forming an IPN structure, whose matrix is a thermoplastic resin; the manufacturing method for this composite is by means of the "melt-blending" technique. The composite comprises: A) polyolefins (PE, PP), aromatic polyesters (PET, PBT), polyacetal, polystyrene, or polyester; B) organic or inorganic fibers, like polystyrene resins; and C: a thermoplastic additive that plays the role of an interfacial agent between A and B phases. As shown in the description, the interfacial agent does not have an acrylic component which can form the IPN structure for the sole compatibilizer. In addition, the continuous phase in the present invention is composed by polyacrylic polymer.

WO9417226A1 shows a polymer blend which main phase comprises polypropylene (or any polyester, polyacrylate, polyolefin, or polyamide), and the disperse phase comprises polyethylene. PE/PP is one of the most common polymer blends attempts. In this case, the composition may include up to 20% wt of any adhesive which promotes the adhesion, such as poly ethylene vinyl acetate, ethyl methacrylate, ethylene ethyl acrylates; even though the composition includes acrylates as compatibilizer-like additive, it is not suggested or disclosed how it would be improved when the additive is a mixture of acrylic and a TPE with an IPN structure, such as in the case of the present invention.

Finally, document WO9425526A1 discloses the most traditional method (even nowadays) to create polymer blends (as shown in the previously cited documents). The process consists on modifying or functionalizing polymers, by grafting them with some other substances (such as maleic anhydride, MA), to be able to blend them; contrary to the present invention, where neither the acrylic polymer, nor the TPE, were grafted, making the manufacturing process less complex, due to the fact that neither the compatibilizer, nor the non-compatible polymers require a previous treatment (such as grafting).

In light of the above, the present invention discloses a new compatibilizer based on an interpenetrating polymer network (IPN) because it is a combination of two or more polymers in network form, where at least one of them is synthesized and/or cross-linked in the immediate presence of the other. This type of compatibilizer has a higher number of functional groups and also will contain chemical structure that will interact with the blend components. Also, the method for blending recyclable plastics is new, since the novel compatibilizer is needed without additional pre-treatment processes (such as grafting).

SUMMARY OF THE INVENTION

The present invention discloses and claims:

A compatibilizer, comprising a thermoplastic elastomer and an acrylic polymer, wherein said thermoplastic elastomer and said ester or acrylic polymer form an interpenetrating network.

As an embodiment of the invention, said thermoplastic elastomer is selected from the group consisting of: Styrene-butadiene-styrene (SBS), Styrene-ethylene-butadiene-styrene (SEBS), Ethylene propylene rubber (EPR), ethylene-butadiene (EB), Styrene-ethylene-propylene-styrene (SEPS), or mixtures thereof.

As a preferred embodiment of the invention, said thermoplastic elastomer is SEPS (Styrene-ethylene-propylene-styrene), wherein said thermoplastic elastomer is in an amount of 10 to 30% w/w.

As an embodiment of the invention, said acrylic polymer is selected from the group consisting of: Polyacrylate emulsion, poly (butyl acrylate), polyacrylamide, poly (methyl methacrylate), poly (butyl acrylate), poly methacrylamide, poly (N-methyl acrylamide), poly (N-ethyl acrylamide), poly (n-propyl acrylamide), poly (n-octyl acrylamide), poly (N,N-diethylacrylamide), poly (N, N-diethyl methacrylamide), polyacrylonitrile, poly (methacrylic acid), poly (crotonic acid), poly (sorbic acid), poly (glutonic acid), poly (β-styryl acrylic acid) or poly (acrylic acid) (PAA), or mixtures thereof. As a preferred embodiment of the invention, said acrylic polymer is poly (acrylic acid), wherein said poly (acrylic acid) is in an amount of 70 to 90% w/w.

The compatibilizer further comprises a surfactant, an initiator and water.

Also, it is claimed a method for preparing a compatibilizer, comprising the steps of: a) heating water with a surfactant; b) adding a thermoplastic elastomer; c) adding an initiator; d) adding an acrylic monomer.

In an embodiment of the method, said thermoplastic elastomer is selected from the group consisting of: Styrene-butadiene-styrene (SBS), Styrene-ethylene-butadiene-styrene (SEBS), Ethylene propylene rubber (EPR), ethylene-butadiene (EB), Styrene-ethylene-propylene-styrene (SEPS), or mixtures thereof.

As a further embodiment of the method, said thermoplastic elastomer is in an amount of 10 to 30% w/w.

In an additional embodiment of the method, said acrylic polymer is selected from the group consisting of: acrylate emulsion, butyl acrylate, acrylamide, methyl methacrylate, butyl acrylate, methacrylamide, N-methyl acrylamide, N-ethyl acrylamide, n-propyl acrylamide, n-octyl acrylamide, N,N-diethylacrylamide, N,N-diethyl methacrylamide, acrylonitrile, methacrylic acid, crotonic acid, sorbic acid, glutonic acid, β-styryl acrylic acid or acrylic acid, or mixtures thereof. As a further embodiment of the method, said poly (acrylic acid) is in an amount of 70 to 90% w/w.

According to the scope of the invention, it is disclosed and claimed as an embodiment a method for recycling plastic polymers, comprising contacting a compatibilizer as above disclosed with one or more recyclable plastic polymers in suitable conditions for blending.

Finally, as an additional embodiment of invention, it is disclosed and claimed a polymer mixture, comprising a compatibilizer as above disclosed and one or more recyclable plastic polymers.

DETAILED DESCRIPTION OF THE INVENTION

Figure 1:
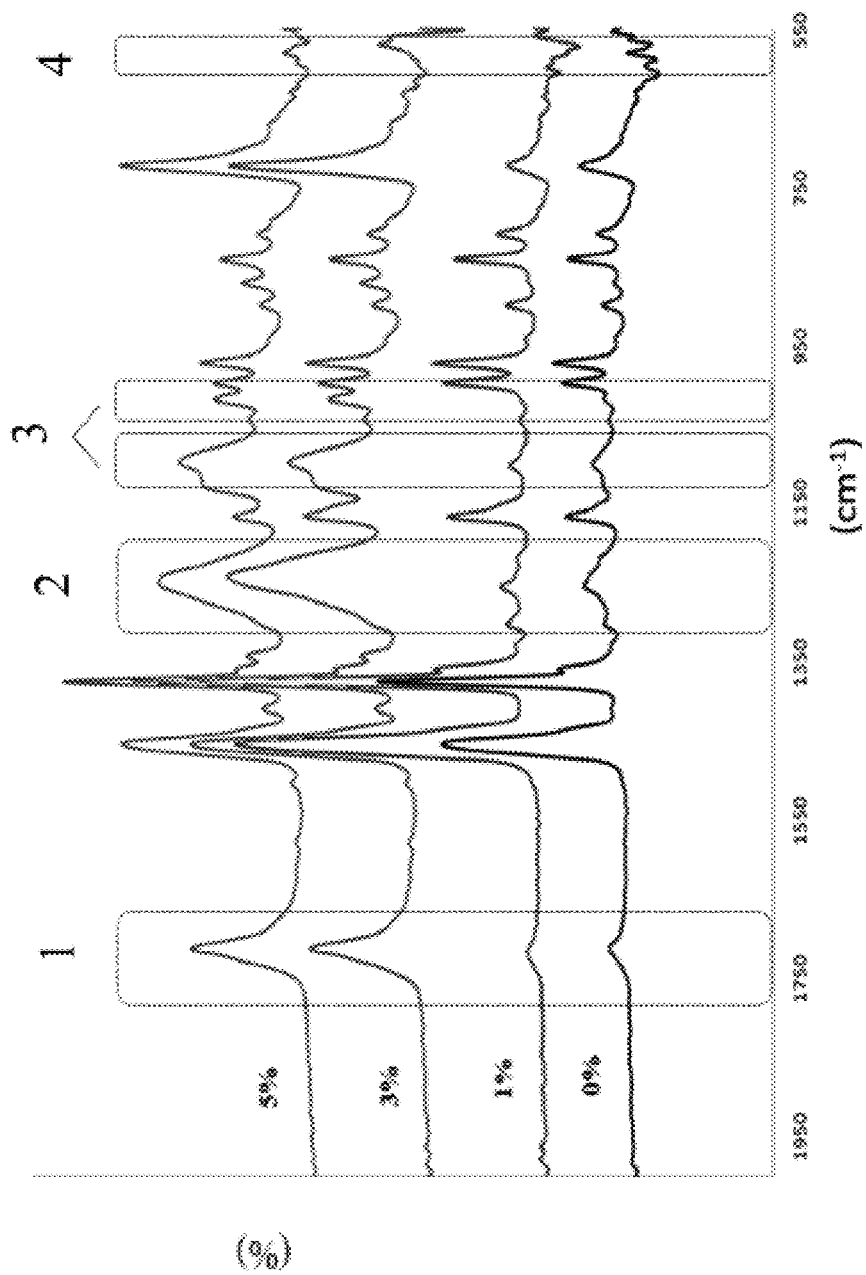
FIG. 1. shows an Infrared analysis of the blends with 75 wt % PP and 25 wt % PET with 0, 1, 3 and 5% wt of compatibilizer. 1: Carbonyl (>C=O) Ester, 2: Bond (C—O) ester; 3: Aromatic Ether (—O—$CH_2$); 4: Aliphatic ethers ($CH_2$—O—$CH_2$). X axis: wavenumber (cm-$^1$); Y axis: Absorbance (%).

The purpose of the present invention is providing a method for recycling polymeric materials usually considered as disposable, without the need of a complex pre-treating step, since the pre-treating steps consume time, human resources and need specialized equipment. Thus, the instant invention provides a method for obtaining a polymeric material with high commercial value and good mechanical properties by means of an economical feasible process.

The instant invention is related with recycling plastic polymers. This is carried out by using a compatibilizer. According to the present invention, it should be understood that a compatibilizer is a polymer with functional groups and/or chemical structure able to interact chemical or physically with polymer in blends for recycling purposes. The compatibilizer is based on an interpenetrated polymer network (IPN). In this sense, the term "interpenetrated polymer network (IPN)" should be understood under the scope of the present invention as the combination of two polymers, admixed and synthesized in the immediate presence of each other forming a network. Such IPN can interact with recyclable polymers like polyolefins and polyesters.

The compatibilizer comprises a thermoplastic elastomer selected, but not limited to a group consisting of: SBS: Styrene-butadiene-styrene, SEBS: Styrene-ethylene-butadiene-styrene, EPR: Ethylene propylene rubber, ethylene-butadiene, SEPS (Styrene-ethylene-propylene-styrene), or mixtures thereof.

Additionally, said compatibilizer comprises at least an additional component selected, but not limited to: Polyacrylate emulsion, poly (butyl acrylate), polyacrylamide, poly, poly (methyl methacrylate), poly (butyl acrylate), poly methacrylamide, poly (N-methyl acrylamide), poly (N-ethyl acrylamide), poly (n-propyl acrylamide), poly (n-octyl acrylamide), poly(N,N-diethylacrylamide), poly (N,N-diethyl methacrylamide), polyacrylonitrile, poly (methacrylic acid), poly (crotonic acid), poly (sorbic acid), poly (glutonic acid), poly (β-styryl acrylic acid) or poly (acrylic acid) (PAA), or mixtures thereof.

Said compatibilizer is useful for recycling plastic polymers such as, but not limited to: polyolefins, polyolefin elastomers, polyesters, polymeric resins.

Compatibilizer Synthesis

As a method for preparing the compatibilizer, but not limiting for the invention's scope, in general terms, the thermoplastic elastomer is emulsified with an additional component such as a surfactant. Said admixture is heated until a suitable temperature in order to homogenize said mixture and therefore a polymerization initiator is added. Afterwards an additional component such as acrylic monomers, is added, with increasing temperature in order to promote polymerization, thus obtaining a compatibilizer in the form of an IPN.

Therefore, the method for preparing a compatibilizer comprising the steps of: a) heating water with a surfactant;

b) adding a thermoplastic elastomer; c) adding an initiator and a crosslinking agent; d) adding an acrylic monomer.

The thermoplastic elastomer is selected from a group consisting of: SBS: Styrene-butadiene-styrene, SEBS: Styrene-ethylene-butadiene-styrene, EPR: Ethylene propylene rubber, EB: ethylene-butadiene, SEPS (Styrene-ethylene-propylene-styrene), or mixtures thereof.

The acrylic monomer is selected from the group consisting of: acrylate emulsion, butyl acrylate, acrylamide, vinyl acetate, methyl methacrylate, butyl acrylate, methacrylamide, N-methyl acrylamide, N-ethyl acrylamide, n-propyl acrylamide, n-octyl acrylamide, N,N-diethylacrylamide, N,N-diethyl methacrylamide, acrylonitrile, methacrylic acid, crotonic acid, sorbic acid, glutonic acid, β-styryl acrylic acid or acrylic acid, or mixtures thereof.

As a working example, the synthesis of a compatibilizer was carried out in a suitable reactor. The polymerization of acrylic acid was performed by free radicals, in emulsion, developed in presence of the thermoplastic elastomer, previously dissolved in toluene and dispersed in the emulsion solution using the surfactant. The procedure started by heating distilled water in the reactor, once a suitable temperature was reached the surfactant was added followed by the thermoplastic elastomer (which was previously dissolved in an organic solvent) under stirring. After that, and once the emulsion was homogenized, an initiator and crosslinking agent was added in a suitable proportion with respect to monomer. Finally, the acrylic acid was added to the reactive medium. The temperature was increased up to a suitable temperature in order to promote polymerization. The IPN was obtained for the combination of two polymers into a network form, where the components were admixed and synthesized in the immediate presence of each other.

On the other hand, materials used for polymer blends can be obtained from plastic waste. For example, polyolefins, polyolefin elastomers, polyamides, polyesters or polymeric resins are suitable for recycling purposes, but generally they are difficult to blend among each other. Therefore, by using the compatibilizer of the instant invention, such kind of plastics can be blended with good mechanical and thermal properties, and even with better interfacial adhesion, and for example being recycled for new applications.

The method for recycling plastic polymers, comprises contacting the compatibilizer with one or more recyclable plastic polymers in suitable conditions for blending, mainly by extrusion process.

In order to blend such kind of plastics, the recyclable plastic materials should be divided into fine pieces, mixed with the compatibilizer and heated up to a suitable temperature to melt said mixture and carrying out its processing, for example, by extrusion. Thereafter, the melted and extruded mixture is pelletized and is ready to reuse accordingly. Therefore a polymer mixture is formed, which comprises the compatibilizer of the present invention and one or more recyclable plastic polymers. Said polymer mixture has good mechanical properties and is suitable for preparing new recycled materials.

As a working example, without limiting the scope of the invention, the recyclable plastics to be blended could be PET/LDPE, PP/PET or any other polyolefin/polyolefin, polyester/polyester, polyolefin/polyester blend.

The following examples should be considered as preferred embodiments of the invention, without limiting its scope.

EXAMPLES

Example 1

Compatibilizer Synthesis

The compatibilizer was synthesized in a 500 mL glass reactor. The polymerization of acrylic acid was performed by free radicals, in aqueous solution. Distilled water was heated up to 65° C. in the glass reactor, once this temperature was reached the surfactant was added followed by SEPS (which was previously dissolved in toluene with a concentration of 20% w/w) (TPE) under stirring. Thus, interaction between TPE and acrylic acid is possible in the interface between surfactant containing TPE within and acrylic acid, generating a TPE embedded into the poly (acrylic acid). Afterwards, once the emulsion was homogenized at 65° C., the Vazo64 was added (1 w/w in ratio to monomer) and 1 minute later was added the methylenebisacrylamide, the cross-linked agent (0.65% w/w in ratio to monomer). Then, the acrylic acid was added to the reactive medium. The temperature was increased to 72° C. in order to promote polymerization. Thus, the IPN was obtained, where poly (acrylic acid) (PAA), 70-90% w/w, was synthesized in the immediate presence of styrene-ethylene-propylene-styrene triblock copolymer (SEPS), 10-30% w/w, respectively.

Example 2

PP/PET/Compatibilizer Blend

For this illustrative example, recycled PET and recycled PP in form of pellets were used. The compatibilizer was syntetized as in Example 1. The IPN was synthetized using azo-isobutyronitrile, thermoplastic elastomer, toluene, acrylic acid, surfactant and distilled water.

The PET and PP pellets and the compatibilizer were dried at 100° C. for one day in an oven. Then, the PET pellets were blended with the PP pellets in a DSM Xplore Micro 15 cc Twin Screw Compounder. The screw speed was 250 rpm, the temperature was 250° C. and the retention time was three minutes, the conditions were determined according to the best results from previous tests of retention time with 2, 3, 5 and 8 minutes, and temperatures of 210, 240, 250 and 260° C. Table 1 shows the proportions of components in the blends.

TABLE 1

| Composition of blends PET/PP | | | | |
|---|---|---|---|---|
| Blends | Identification | PET (% w/w) | PP (% w/w) | Compatibilizer (% w/w) |
| 1 | 25/75/0 | 25.00 | 75.00 | 0.00 |
| 2 | 25/75/1 | 24.75 | 74.25 | 1.00 |
| 3 | 25/75/3 | 24.25 | 72.75 | 3.00 |
| 4 | 25/75/5 | 23.75 | 71.25 | 5.00 |
| 5 | 50/50/0 | 50.00 | 50.00 | 0.00 |
| 6 | 50/50/1 | 49.50 | 49.50 | 1.00 |
| 7 | 50/50/3 | 48.50 | 48.50 | 3.00 |
| 8 | 50/50/5 | 47.50 | 47.50 | 5.00 |
| 9 | 75/25/0 | 75.00 | 25.00 | 0.00 |
| 10 | 75/25/1 | 74.25 | 24.75 | 1.00 |
| 11 | 75/25/3 | 72.75 | 24.25 | 3.00 |
| 12 | 75/25/5 | 71.25 | 23.75 | 5.00 |

Fourier transformed infrared spectroscopy (FTIR). Regarding to infrared analysis, in blends with 75 and 50% wt of PP, infrared bands do not change in with increasing content of compatibilizer due to interactions are secondary type, i.e. the hydroxyl of PAA and carbonyl of PET are forming hydrogen bonds. However, at frequencies near 573 cm$^{-1}$ associated with aliphatic ethers (R—O—R) and 1250 cm$^{-1}$ corresponding to C—O bonds, which have increased and motion of wavenumber which would suggest that a transesterification or alcoholysis occurring between the functional groups of PAA content of the compatibilizer and the PET generating structures with ether groups. FIG. 1 shows the FTIR spectra of Blends 75/25 (PET/PP), with different percentages of compatibilizer.

Dynamic thermomechanical properties (DMTA Analysis). In DMTA analysis, the mechanical response of a viscoelastic material is studied as a function of temperature and time, while it is subjected to a sinusoidal strain. DMTA spectra on blends can provide information on the degree of polymer-compatibilizer interaction and interphase blending. In the Table 2 shows the values of tan δ, E' and E" for each blend at different concentration of compatibilizer. Tan δ is the ratio of the viscous modulus to the elastic modulus. Tan δ is the measure of the damping ability of the material. As can be seen, addition of compatibilizer in the blends is generating structural modifications in the polymer blend, which are reflected in the movements of the values of modulus E' and E".

TABLE 2

Results of DMTA analysis

| | PP | | | PET | | |
|---|---|---|---|---|---|---|
| Blend | Tan δ | E' | E" | Tan δ | E' | E" |
| 1- 25/75/0 | 0.058 | 5.96E+08 | 3.47E+07 | 0.097 | 1.28E+08 | 1.24E+07 |
| 2- 25/75/1 | 0.071 | 6.26E+08 | 4.44E+07 | 0.095 | 1.55E+08 | 1.47E+07 |
| 3-25/75/3 | 0.071 | 6.35E+08 | 4.52E+07 | 0.094 | 1.47E+08 | 1.38E+07 |
| 4- 25/75/5 | 0.063 | 6.81E+08 | 4.29E+07 | 0.087 | 1.68E+08 | 1.46E+07 |
| 5-50/50/0 | 0.058 | 6.37E+08 | 3.70E+07 | 0.112 | 1.65E+08 | 1.85E+07 |
| 6-50/50/1 | 0.064 | 7.02E+08 | 4.48E+07 | 0.108 | 1.97E+08 | 2.13E+07 |
| 7-50/50/3 | 0.062 | 7.29E+08 | 4.54E+07 | 0.109 | 2.41E+08 | 2.62E+07 |
| 8-50/50/5 | 0.054 | 5.89E+08 | 3.17E+07 | 0.102 | 1.70E+08 | 1.73E+07 |
| 9-75/25/0 | 0.055 | 5.06E+08 | 2.76E+07 | 0.133 | 1.65E+08 | 2.20E+07 |
| 10-75/25/1 | 0.049 | 7.98E+08 | 3.88E+07 | 0.140 | 2.09E+08 | 2.93E+07 |
| 11-75/25/3 | 0.057 | 7.20E+08 | 4.11E+07 | 0.134 | 2.31E+08 | 3.09E+07 |
| 12-75/25/5 | 0.054 | 7.22E+08 | 3.92E+07 | 0.126 | 2.04E+08 | 2.57E+07 |

The study area is located between −30 and 50° C. which corresponds to the glass transition zone of the blend. In mixtures with 25 and 50 wt % PET content, the mixing behavior was dominated by the continuous phase of PP. Furthermore as the temperature increases the PP shows elastomeric behavior and the contribution of PET domain in the elastic modulus is more noticeable.

Figure 2:
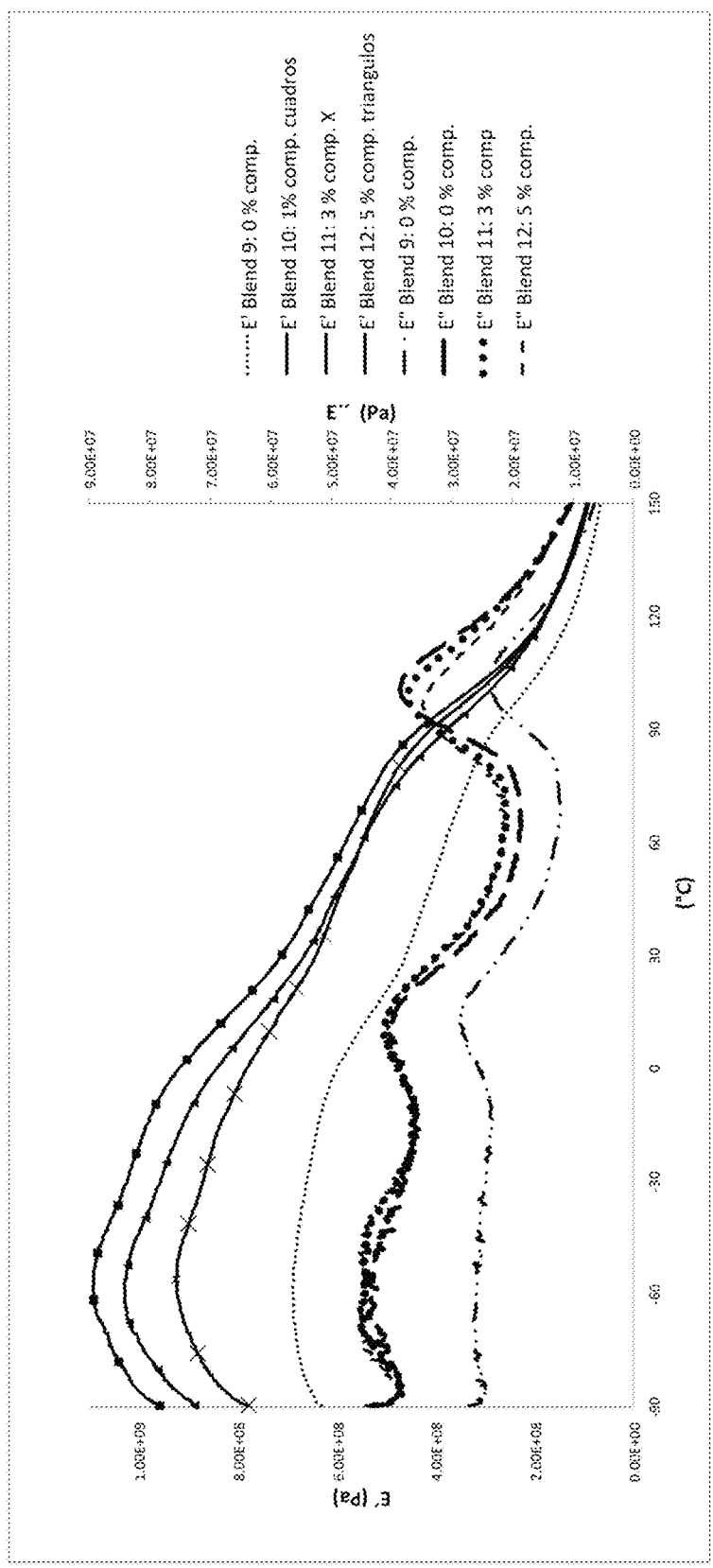
FIG. 2. shows a DMTA analysis of blends with 75% wt PET, 25% wt PP, blends corresponding to 9, 10, 11 and 12 of Table 1, respectively. X axis: Temperature (° C.).

The compatibilized blends had higher elastic modulus. The increase in E' indicates a greater interaction between PET and PP induced by the compatibilizer. It is clear the increase in the magnitude of the viscous modulus (E") of the blends compatibilized with 1 to 3% by weight compatibilizer, with respect to blends without compatibilizer, which may be due to a plasticizing effect of the compatibilizer. However, for blend with 5 wt % compatibilizer, the viscous modulus decreases giving higher stiffness of the material. FIG. 2 shows the viscoelastic behavior of blends with continuous phase of PET.

The compatibilizer concentration effect on the blend is clear, because when adding 1 wt % of the IPN, shows an increase in E' and E", so that while there is a reinforcement, the viscous modulus also increases the effect of the coupling of the compatibilizer. However, the increment of the concentration of compatibilizer to 3 wt %, the viscous module remains constant while the elastic modulus has higher values. The increment in the elastic modulus (E') implies an increase in the material's ability to recover after cessation of stress applied to it and is a result of better interaction between the two polymers. This involves that there is less interfacial tension between the phases of blend due to a better continuity of the structure given by the action of the compatibilizer.

Finally, in the blend with 5 wt % produces a good elastic modulus, however, despite the increase of the amount of compatibilizer there is not an increase in the viscosity of the blend, which can be concluded that continuous phase PET, interacts with compatibilizer properly by the PAA portion (70% wt). On the other hand, the TPE present at 30% wt in compatibilizer, interacts with the dispersed phase of PP.

Differential Scanning Calorimetry (DSC)

Thermal properties analyzed by DSC for pure components and the blends are summarized in Table 3. The $T_m$ of pure PET is 238.4° C., and 156.1° C. in the case of PP.

The degree of crystallinity of the components in polymer blends was calculated from the ratio of enthalpy of fusion ($\Delta H_m$) of the sample, observed in the second heating cycle, and the $\Delta H_m$ of 100% crystalline polymer (136 J/g PET and 189 J/g for PP).

TABLE 3

Thermal behavior of blends.

| | | PP | | | PET | | |
|---|---|---|---|---|---|---|---|
| Blends | PET/PP/Comp | $T_m$ (° C.) | $\Delta H_m$ (J/g) | % crystallinity | $T_m$ (° C.) | $\Delta H_m$ (J/g) | % crystallinity |
| PP | 0/100/0 | 156.1 | 87.9 | 53.4 | | | |
| PET | 100/0/0 | — | — | — | 238.4 | 43.9 | 29.6 |
| 1 | 25/75/0 | 156.7 | 77.7 | 47.2 | 234.4 | 5.9 | 3.6 |
| 2 | 25/75/1 | 156.9 | 70.2 | 42.6 | 235.6 | 5.9 | 3.6 |
| 3 | 25/75/3 | 157.9 | 85.0 | 51.6 | 235.3 | 7.2 | 4.4 |
| 4 | 25/75/5 | 158.9 | 84.0 | 50.9 | 232.4 | 6.9 | 4.2 |
| 5 | 50/50/0 | 155.4 | 58.3 | 35.4 | 235.6 | 13.9 | 8.4 |
| 6 | 50/50/1 | 158.4 | 56.8 | 34.5 | 237.8 | 14.0 | 8.5 |
| 7 | 50/50/3 | 156.2 | 60.1 | 36.4 | 235.4 | 14.0 | 8.5 |
| 8 | 50/50/5 | 158.8 | 54.9 | 33.3 | 234.7 | 13.6 | 8.2 |
| 9 | 75/25/0 | 156.5 | 41.6 | 25.3 | 238.1 | 20.5 | 12.5 |
| 10 | 75/25/1 | 155.7 | 35.9 | 21.7 | 238.4 | 21.9 | 13.3 |
| 11 | 75/25/3 | 154.6 | 38.4 | 23.3 | 236.5 | 23.1 | 14.0 |
| 12 | 75/25/5 | 156.3 | 36.6 | 22.2 | 235.0 | 23.0 | 13.9 |

Regarding the thermal behavior of blends with 75 wt % of PP (blends 1 to 4), the melting point ($T_m$) of PP in the blend without compatibilizer (blend 1) is similar to pure PP due to the lack of interaction of the matrix with the dispersed phase, however, the $T_m$ of PET shows a slight decrease even with its relative low proportion in the blend. The $T_m$ of PET in blends 2, 3 and 4, with different content of compatibilizer showed the characteristic behavior of a compatibilized blend, which corresponds to a decrease of $T_m$ of PET while the $T_m$ of PP tends to increase, which implies that there is a better interaction between the blend components.

In terms of crystallinity of the material, the addition of 1 wt % of compatibilizer decreases the degree of crystallinity ($\chi_c$) of blend, however with the addition of 3 to 5 wt % of compatibilizer the blends show an increase in $\chi_c$ of both components, so that the compatibilizer can be acting as a nucleating agent crystals of both polymers, thereby improving the regularity of the blend.

Blends with 50 wt % PP (blend 5 to 8) show a similar behavior to the above mixtures. For this case, due to the proportions of the polymers, the melting temperatures of the two components tend to approach, since, being improved interactions in the blend by the action of the compatibilizer. In the case of the $T_m$ of PET, it decreases but does not change its crystallinity by increasing the concentration of compatibilizer. The $T_m$ of PP increases slightly with the addition of compatibilizer, which may be due to the links between the PAA and PET is considerably large, so that the sum of forces is high and is therefore only possible to fusion at higher temperatures. When the ratio of PET/PP is in the same proportions, no significant changes in the degree of crystallinity of each component despite the increase in the concentration of compatibilizer takes place, which may indicate a good match in the blend.

Figure 3:
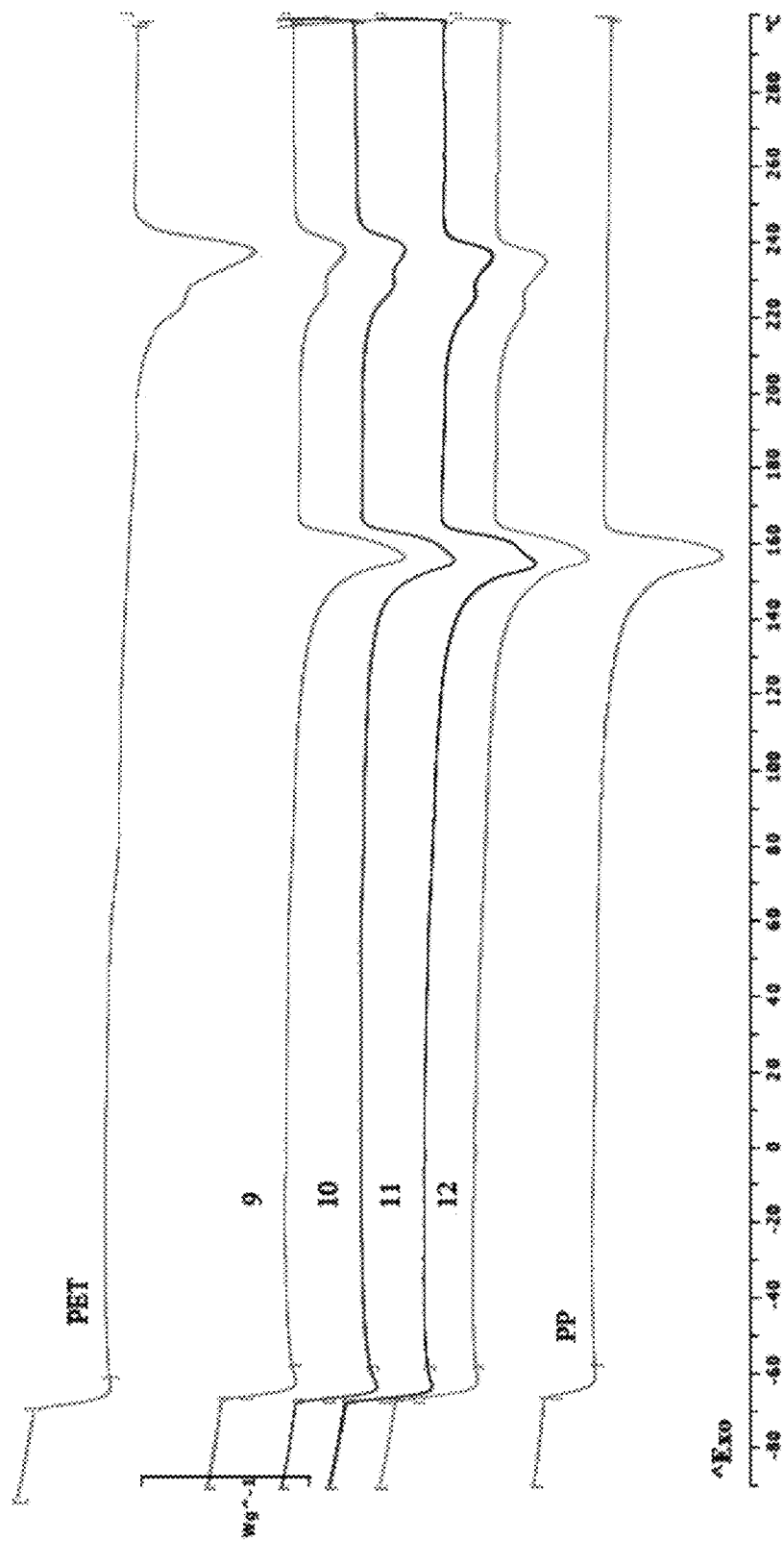
FIG. 3: shows a DSC thermograms of blends 75% wt PET and 25% wt PP with 0, 1, 3 and 5% wt of compatibilizer. First line: PET: Tm 238° C.; 9: Blend 9 0% compatibilizer, Tm 157° C. second Tm 238° C.; 10: Blend 10: 1% compatibilizer, Tm 156° C., second Tm 238° C.; 11: Blend 11: 3% compatibilizer, Tm 155° C., second Tm 237° C.; 12: Blend 12 5% compatibilizer. Tm 156° C., second Tm 235° C. Last line: pure PP: Tm 156° C.

As show in the FIG. 3, in blends with PET continuous matrix the $T_m$ of the dispersed phase (PP) is similar to that of pure PP, whereas the melting temperature of the PET has decreased with increasing the amount of compatibilizer, this is due possibly to the PP in PET matrix begins to melt at lower temperatures since the compatibilizer improves interaction between phases and molecular motion promotes that continuous phase begins to melt at lower temperatures. The percentage of crystallinity of the dispersed phase is not altered; however, the matrix has an increased degree of crystallinity promoted by the action of the compatibilizer.

In general it is observed that the $T_m$ of the continuous phase changes as the $T_m$ of the disperse phase tends to remain constant. The percentage of crystallinity increased with the addition of compatibilizer which could be generated nucleation points due to the compatibilization. The PET showed a double melting behavior, in which crystals begin to melt and partially melt unlinked chains promote local recrystallization resulting in secondary crystals which melts at a higher temperature.

Microscopy SEM

The morphology of the blends was examined by SEM. Table 4 shows the values of $D_n$, $D_w$ and PDI of the blends.

TABLE 4

Morphological parameters of the blends PET/PP with and without compatibilizer

| Blends | $D_n$ (μm) | $D_w$ (μm) | PDI |
|---|---|---|---|
| 1 | 10 | 13 | 1 |
| 2 | 3 | 4 | 2 |
| 3 | 2 | 4 | 2 |
| 4 | 4 | 6 | 2 |
| 5 | 9 | 24 | 3 |
| 6 | 6 | 24 | 4 |
| 7 | 2 | 4 | 1 |
| 8 | 4 | 6 | 2 |
| 9 | 6 | 7 | 1 |
| 10 | 5 | 5 | 1 |
| 11 | 3 | 5 | 2 |
| 12 | 1 | 3 | 3 |

Figure 4:
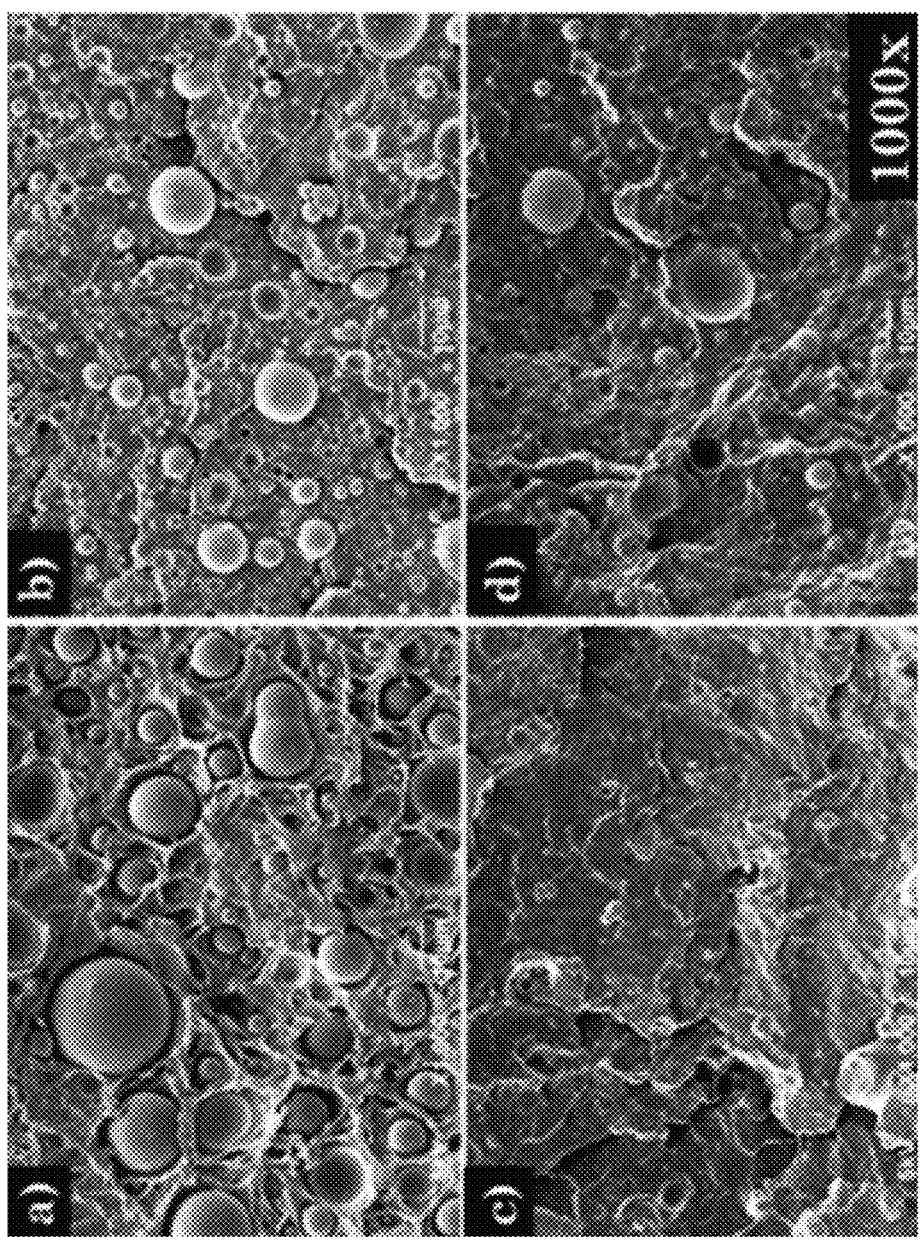
FIG. 4. shows a Surface micrographs of blends 25/75% wt. (PET/PP) at 1000× magnification, a) Blend 1: without compatibilizer, b) Blend 2: 1% wt compatibilizer, c) Blend 3: 3% wt compatibilizer d) Blend 4: 5% wt compatibilizer.

The effects of the compatibilizer in the blends with 75 wt % of PP may be seen by comparing the morphology shown in FIG. 4. The image clearly shows the effect of compatibilizer in blends (25/75 wt % PET/PP), where in the sample without compatibilizer (image a) shows a great separation between the matrix and the dispersed phase. Particles of PET are large with average diameter of 10 μm and no visible interaction with the PP matrix due to their incompatibility. However, with 1 and 3 wt % of compatibilizer (image b) and c), respectively) showed an increase in the interaction of the components of the blend, which is reflected in a decrease in average diameter of particle (3 μm and 2 μm), increased adherence of PET matrix particles and more homogeneous surface.

Figure 5:
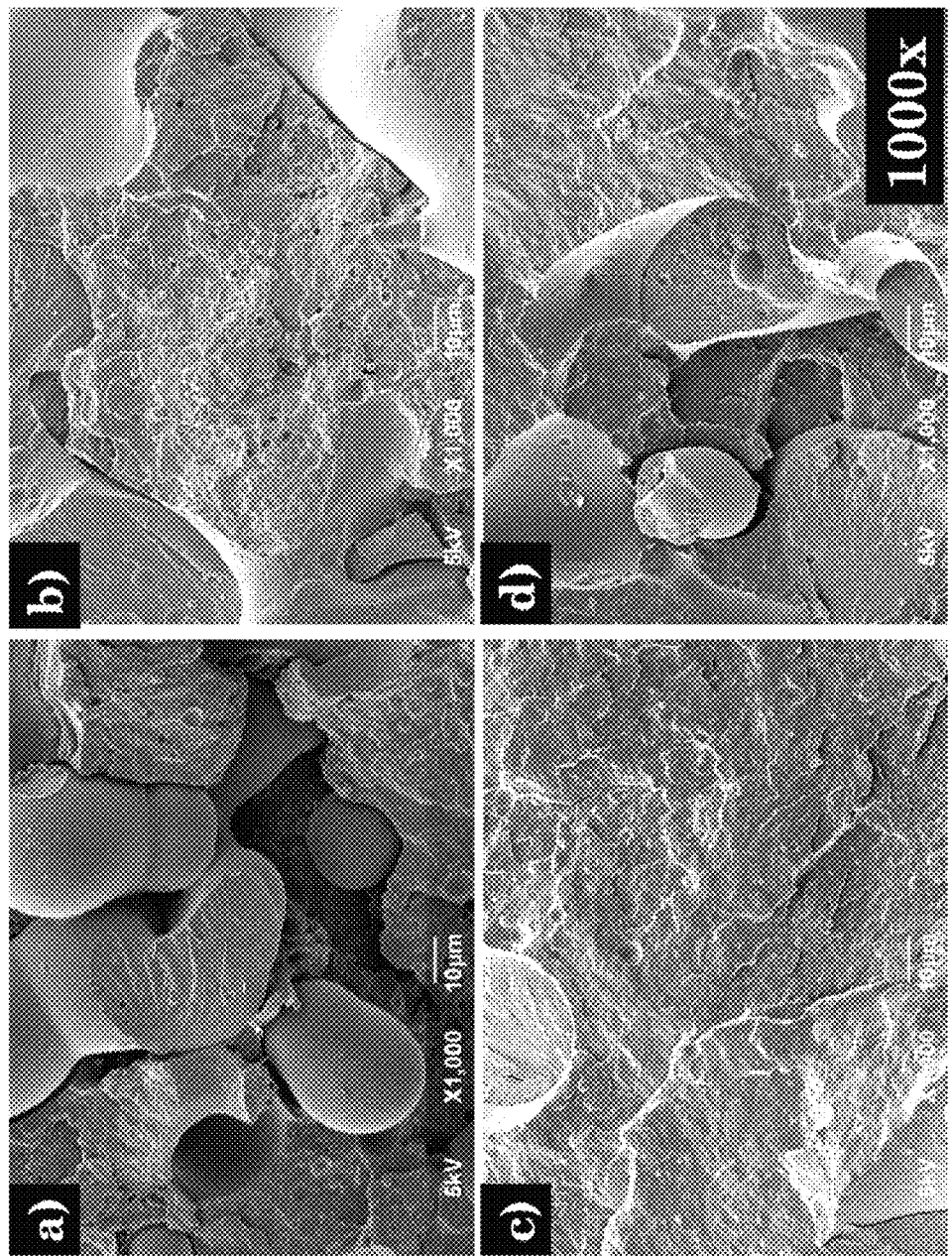
FIG. 5. shows a surface micrographs of blends 50/50% wt (PET/PP) at 1000× magnification, a) Blend 5: without compatibilizer, b) Blend 6: 1% wt compatibilizer, c) Blend 7: 3% wt compatibilizer d) Blend 8: 5% wt compatibilizer.

The concentration of compatibilizer (in the case with 1 to 3 wt %) corresponds approximately to the amount of copolymer required to saturate the interface, and in these conditions the particle size reduction is due to the suppression of coalescence. On the other hand on the image d), the addition of 5 wt % of compatibilizer promotes the generation of larger dispersed particles (4 μm). This is clear evidence that the compatibilizer is promoting interfacial tension reduction and better adhesion between the components of the blends. The micrographs of the compatibilized blends show improved adhesion between the two phases, even to low IPN, and the dimensions of the particles are smaller. This behavior can also be observed in the following FIG. 5 for blends with a ratio of 50/50 wt %.

Figure 6:
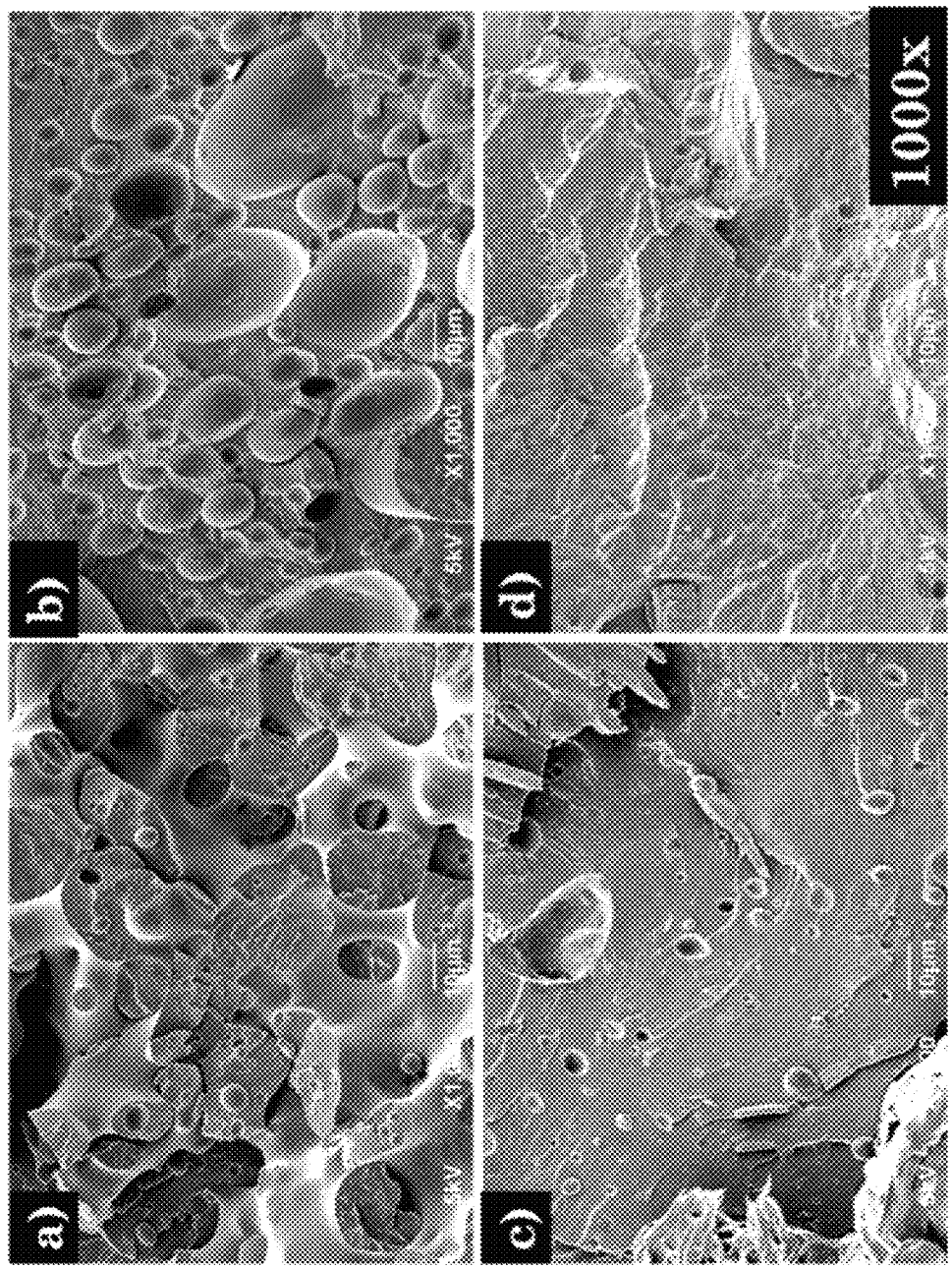
FIG. 6. shows a surface micrographs of blends 75/25% wt (PET/PP) at 1000× magnification: a) Blend 9: without compatibilizer, b) Blend 10: 1% wt compatibilizer, c) Blend 11: 3% wt compatibilizer and d) blend 12: 5% wt of compatibilizer.

For blends with 50 wt % PET, the FIG. 6-a) corresponds to the blend without compatibilizer showing large particles with average diameter of 9 μm. The blend with 3 wt % of compatibilizer (image c)) have better interfacial adhesion and morphology with fine particles with average size of 2 μm in contrast to the blend without compatibilizer, and with blends with 1 and 5 wt % of IPN (4 and 6 μm respectively). When increasing the proportion of the compatibilizer in the blend, it is possible that part of the compatibilizer being combined with the PP and the PET phase in the form of micelles resulting in larger particles.

Finally, in FIG. 6 shows the SEM analysis of blends with continuous phase of PET. The non compatibilized blend 75/25 (PET/PP) (FIG. 6-a)) shows the craters of the PP in the PET matrix, which is common for poor interfacial interaction. However, the average particle diameter obtained was 6 μm, which shows that these proportions to achieve a good interaction of the components of the blends regardless of their incompatibility. The reduction in domain size, which is smaller in the samples compatibilized mainly the content of 5 wt % of compatibilizer in the blend (FIG. 6-d)), which shows a drastic change in morphology obtaining a morphology $D_n$ homogeneous than 1 μm in comparison with blends containing 1 and 3 wt %. of compatibilizer corresponding to images 5-b) and c) respectively with average particle diameters of 5 and 3 μm respectively. This is a result of the interaction and adhesion between the PET and the compatibilizer PAA due to intermolecular dipole-dipole interactions between oxygen present in the carbonyl groups of the acrylic acid and hydrogen in the hydroxyl group of PET, as well as the possible occurrence of alcoholysis or transesterification reactions.

As a result, an IR analysis showed molecular interactions among the mixtures PET/PP/compatibilizer, but not in samples without compatibilizer. Moreover in the mechanical tests, PET content reinforced the properties of the final material according to obtained Young modulus.

These results confirmed that the compatibilizer of the present invention is useful for favoring the interactions between polymers, in this particular case but not limiting, PET and PP, increasing their mechanical properties and therefore, useful as a recycled material for several applications.

Example 3

PET/LDPE/Compatibilizer Blend

In the case of PET, the material can be obtained from plastic beverage bottles. The LDPE was obtained from crushed bags of post-consumer packing materials. The acrylic acid (99% purity) was purchased from Sigma-Aldrich (St. Louis, USA). The compatibilizer was synthesized as in Example 1. The thermoplastic elastomer (SEPS) was provided by Dynasol SA de CV (Altamira, Tamaulipas, Mexico). Azo-isobutyronitrile (Dupont, USA) with the commercial name of Vazo64, was used as initiator. A phosphate-free detergent dissolved in 30% in distilled water was used as surfactant and it was provided by HYCEL (Guadalajara, Mexico). Toluene (98% purity) was purchased from Baker (NJ, USA). Distilled water was obtained by a purification system using reverse osmosis membrane.

Blend Preparation

PET and LDPE blends were obtained considering the following factors: PET/LDPE ratio, compatibilizer formulation, and concentration of compatibilizer in the blends. Also, control blends (with no compatibilizer) and reference blends (with commercial compatibilizer, a polyethylene grafted with maleic anhydride) were obtained to contrast the result with samples containing the new compatibilizer. The total number of samples is summarized in Table 5.

TABLE 5

PET/LDPE blends, with and without compatibilizer.

| Blend | Identification | PET (% w/w) | LDPE (% w/w) | Compatibilizer type | PAA/SEPS ratio (% w/w) | Compatibilizer concentration (% w/w) |
|---|---|---|---|---|---|---|
| 1 | 1-75C90/1 | 74.25 | 24.75 | IPN | 90/10 | 1.00 |
| 2 | 2-25C90/1 | 24.75 | 74.25 | IPN | 90/10 | 1.00 |
| 3 | 3-75C70/1 | 74.25 | 24.75 | IPN | 70/30 | 1.00 |
| 4 | 4-25C70/1 | 24.75 | 74.25 | IPN | 70/30 | 1.00 |
| 5 | 5-75C90/5 | 71.25 | 23.75 | IPN | 90/10 | 5.00 |
| 6 | 6-25C90/5 | 23.75 | 71.25 | IPN | 90/10 | 5.00 |
| 7 | 7-75C70/5 | 71.25 | 23.75 | IPN | 70/30 | 5.00 |
| 8 | 8-25C70/5 | 23.75 | 71.25 | IPN | 70/30 | 5.00 |
| 9 | 75/25 | 75.00 | 25.00 | None | — | — |
| 10 | 25/75 | 25.00 | 75.00 | None | — | — |
| 11 | MC1 | 74.25 | 24.75 | PE-g-MA | — | 1.00 |
| 12 | MC2 | 71.25 | 23.75 | PE-g-MA | — | 5.00 |
| 13 | MC3 | 24.75 | 74.25 | PE-g-MA | — | 1.00 |
| 14 | MC4 | 23.75 | 71.25 | PE-g-MA | — | 5.00 |

Blends were made using a twin-screw extruder with a temperature profile from 210 to 270° C. Once pellets of the blends were obtained, they were processed in an injection molding machine at temperatures from 240 to 260° C. in molds for mechanical testing under standardized ASTM D638.

Characterization

Infrared Spectroscopy Analysis

Fourier Transformed Infrared Spectroscopy (FTIR).

The infrared spectroscopy analysis of the IPN and the blends, with and without compatibilizer, in different proportions, were characterized by ATR-IR (Attenuated Total Reflectance-Infrared) using a Nicolet FTIR-1700 spectrometer (Thermo, USA), with a diamond window, wavelength 4000-550 $cm^{-1}$, with 64 scans per sample.

Figure 7:
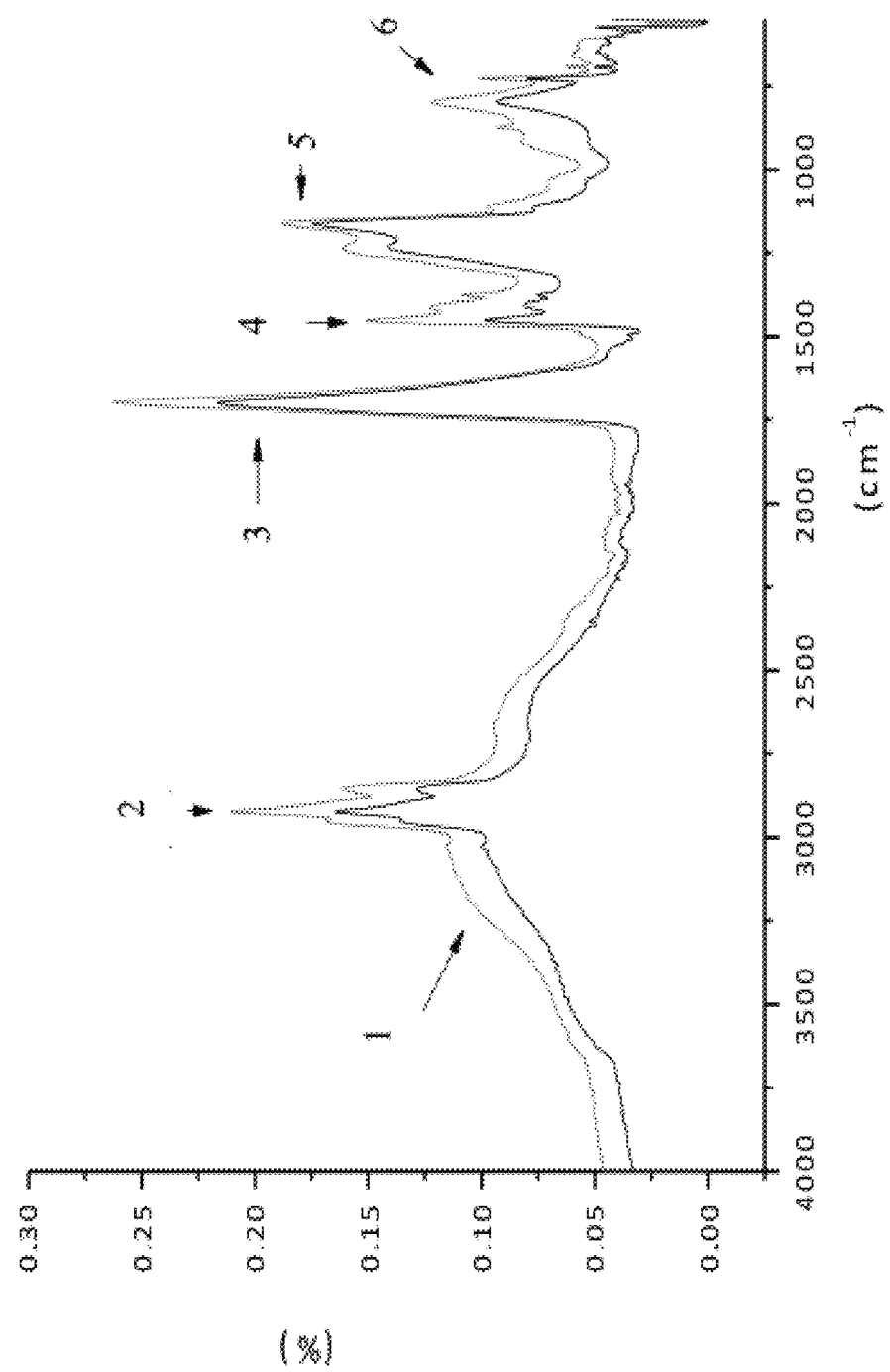
FIG. 7. shows an IR spectra of synthetized compatibilizer with different PAA/TPE ratio, grey line is a 70/30 and black line is a 90/10 ratio. 1: O—H (PAA); 2: C—H (TPE); 3: C=O (PAA); 4: Deformation $CH_2$ (PAA&TPE); 5: C—O (PAA); 6: Aromatic ring (TPE). Y axis: Absorbance (%). X axis: wavenumber (cm-$^1$).

FIG. 7 shows the spectra corresponding to the synthesized compatibilizer at different PAA/TPE ratios: 70/30 and 90/10% w/w. Regarding to the IPN components, the thermoplastic elastomer exhibits the characteristic peaks of single bonds (C—C) near 571 $cm^{-1}$, at 733 $cm^{-1}$, another peak is observed for the aromatic ring. Vibrations for a symmetric torque (C—H) occurs at 1376 $cm^{-1}$ and deformation vibrations for >$CH_2$ are shown at 1459 $cm^{-1}$. Finally, two peaks, one at 2853 $cm^{-1}$ and 2921 $cm^{-1}$ for vibration stretching (C—H) appear. On the other hand, the PAA presents the following peaks: one near 603 cm-1 which is characteristic for single bonds (C—C), another at 1163 $cm^{-1}$ corresponding to the stretching vibrations of C—O bonds, one more peak is observed at 1696 $cm^{-1}$ for the carbonyl (C═O) of saturated carboxylic acids, another peak at 2360 $cm^{-1}$ from the stretching vibration (C—H) and finally a peak at 2957 $cm^{-1}$ showing the stretching vibrations (O—H).

As it can be seen from FIG. 7, there are overlapping of peaks corresponding to those of the parent materials and no generation of new signals is observed. The last is indicative that there is not chemical modification of the materials in the compatibilizer, demonstrating that indeed this is an interpenetrating polymer network (IPN). In such IPN, the interactions between the polymeric constituents are purely physical and therefore the functional groups present in the compatibilizer remain free and able to interact with the components of the polymer blend.

In the case of PET, the characteristic peaks, from FTIR analysis, appear at 724 and 872 $cm^{-1}$ corresponding to the C—H bonds of the aromatic rings, at 1015 and 1092 $cm^{-1}$ corresponding to the symmetric stretching vibrations C—O ester bonds (—COO—), the wavelengths at 1239 and 1341 $cm^{-1}$ are associated with asymmetric stretching vibration of C—O bonds. The —$CH_2$— groups appear at 1453 $cm^{-1}$. The peaks at the wavenumbers of 1504 and 1577 $cm^{-1}$ are related to C—C bonds of the aromatic ring. At 1714 $cm^{-1}$ the peak corresponds to the carbonyl groups (>C═O) of aliphatic ester symmetric vibration and at 2917 $cm^{-1}$ the symmetric vibration $CH_2$ group. In regard to LDPE, the characteristic peaks are observed mainly between 2960 and 2850 $cm^{-1}$ corresponding to stretching vibration of C—H bonds.

Figure 8:
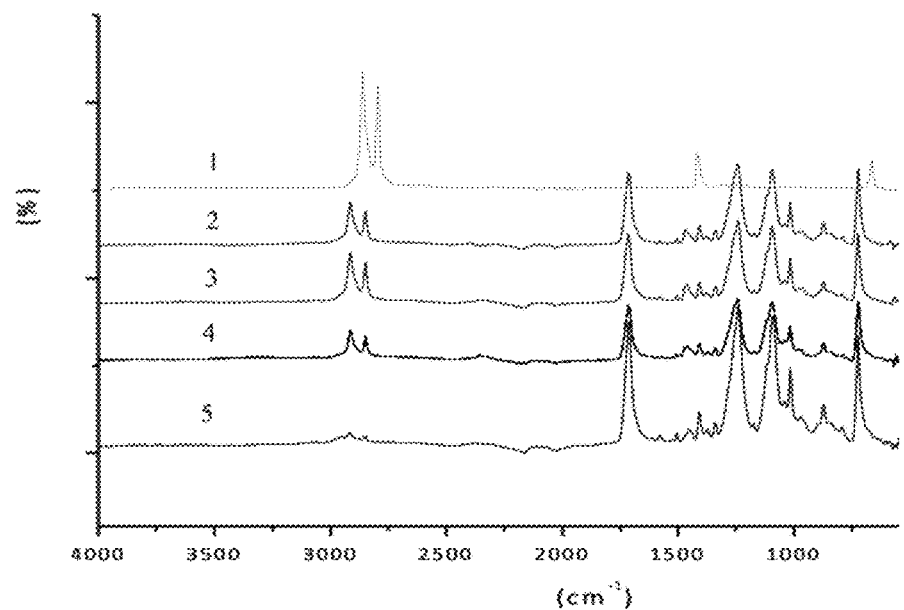
FIG. 8. shows an IR spectra of blends 3-75C7/1 (with 1% w/w compatibilizer), 7-75C70/5 (with 5% w/w compatibilizer) 75/25 (without compatibilizer), PET and LDPE. 1: LDPE; 2: Blend 7-75C70/5; 3: Blend 3-75C70/1; 4: Blend 75/25; 5: pure PET. X axis: wavenumber (cm$^{-1}$); Y axis: absorbance (%).

FIG. 8 shows the spectra of the blends containing 75/25% w/w of PET/LDPE, with the IPN with a PAA/TPE ratio of 70/30% w/w, at two different concentrations (1 and 5% w/w) and without compatibilizer. Also shown are the spectra of the pure components (PET and LDPE). It clearly shows the presence of the characteristic peaks for each compound present in the blend, containing or not compatibilizer. Therefore it is considered that there is not significant chemical interaction, by reaction, between the components. However, secondary interactions could occur by means of hydrogen bonds, where the carbonyl functional group (C═O) and hydroxyl end groups of PET could interact with the carboxylic group (—COOH) of PAA, since the carbonyl signal at 1714 $cm^{-1}$ is slightly broader, especially with 5% w/w of compatibilizer, which is indicative of distinct chemical interaction like hydrogen bonding. The blends having a LDPE matrix (4-25C70/1 and 8-25C70/5) which used the same compatibilizer, presented a similar behavior in the infrared spectrum.

Figure 9:
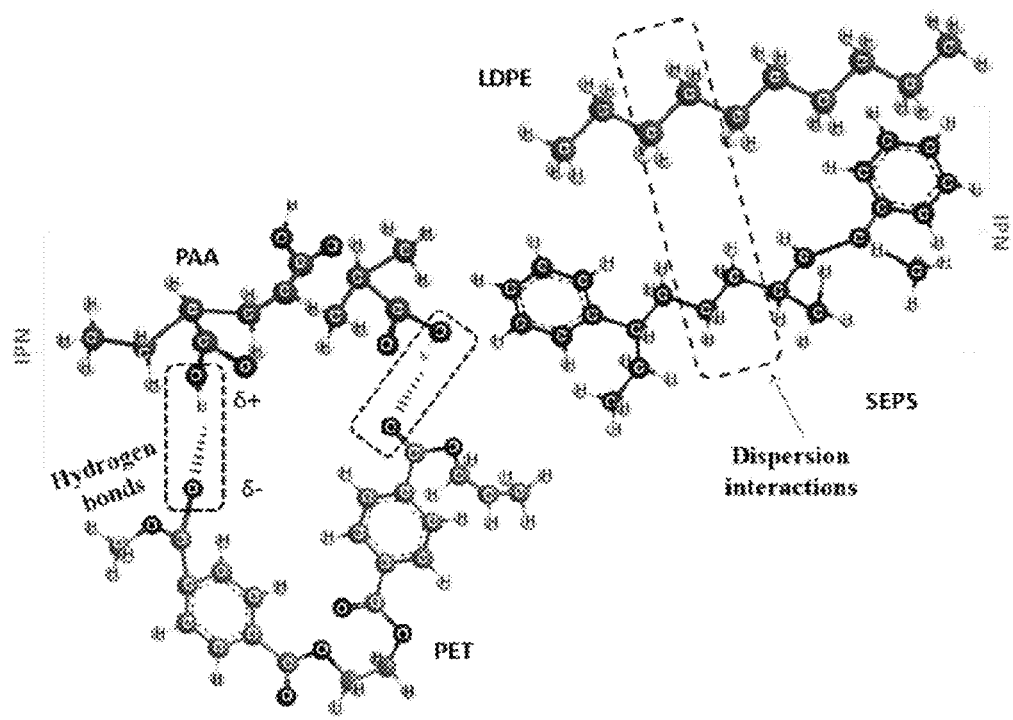
FIG. 9. shows interactions between the components, LDPE and PET, and compatibilizer.

On the other hand, FIG. 9 shows the possible interactions between components and the compatibilizer. These interactions correspond to the formation of domains between the LDPE and the ethylene group of the TPE. In addition, the carbonyl group of PET forms hydrogen bonds with the hydroxyl group of the carboxylic group from PAA.

The interaction between the olefinic groups, —$CH_2$—, from the TPE and LDPE are of the dispersion type, even with the backbone or with the branch of the LDPE. In the case of the TPE, it must be pointed out that saturated portion is constituted by polyethylene and polypropylene structures, since the parent elastomer portion was polyisoprene.

The interactions between the compatibilizer and PET occur by hydrogen bonds, as it was mentioned. In this case, such interactions are highly probable to take place since every repetitive unit of the PAA contains one carboxylic acid able to interact with the carbonyl from the ester group of the PET molecule by the hydrogen of the pendant hydroxyl group. In addition, it could be considered the interaction between the polystyrene molecules located at both ends of the TPE and the aromatic groups of the PET, even when the latter is along the backbone of the PET, which difficult such interaction, but it is probable to occurs. Thus, the designed and synthesized compatibilizer has better and higher interaction with PET and polyolefin than commercial compatibilizer where maleic anhydride is grafted up to 5% by weight into polyethylene.

Figure 10:
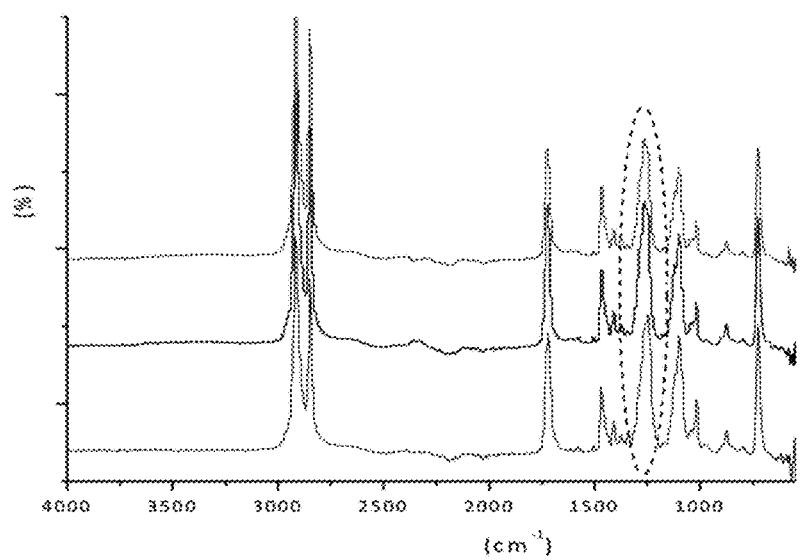
FIG. 10. shows an IR spectra of blends 1: PET/LDPE ratio of 25/75, 2: with compatibilizer at 1% w/w (2-25C90-1) and 3: with compatibilizer at 5% w/w (6-25C90-5). X axis: wavenumber (cm$^{-1}$). Y axis: Absorbance (%). A: C=O. B: C—O.

The spectra for blends with a PET/LDPE ratio of 25/75% w/w are shown in the FIG. 10. The peak of C—O bond is located at 1245 cm$^{-1}$ in the compatibilized blends, which presented a shift to higher wave number (1262 cm$^{-1}$). This displacement is due to the effect of the association of hydrogen bonds, which confirms secondary interactions between the compatibilizer and the PAA. Furthermore, the peak corresponding to C=O (associated to the carboxylic and steric group of PET) at 1720 cm$^{-1}$ and the band of C—O bonds, shows a slight decrease in the intensity of absorbance bands when the concentration of compatibilizer increases, so it can be due to an increase of the interactions with the polymer blend and the compatibilizer.

However, this shift is only present for blends with compatibilizer that contains 90% w/w of PAA, which suggests that higher levels of PAA allow the generation of this type of interactions, due to higher quantity of carboxylic groups.

In addition, it is noteworthy that a decrease in the C=O and C—O bands, can be due to transesterification or hydroxyl functional group substitution (O—H) present in the PAA compatibilizer and the alkoxy group (RO) ester. It is important to mention that compatibilizer acts as an emulsifier in the interface, thereby improving the interaction between the blend components.

Mechanical Analysis

The tension-elongation tests were performed using the equipment INSTRON-33R4467 according to ASTM D638 with a speed of 50 mm/min, at a temperature of 23° C. and relative humidity of 54%.

Figure 11:
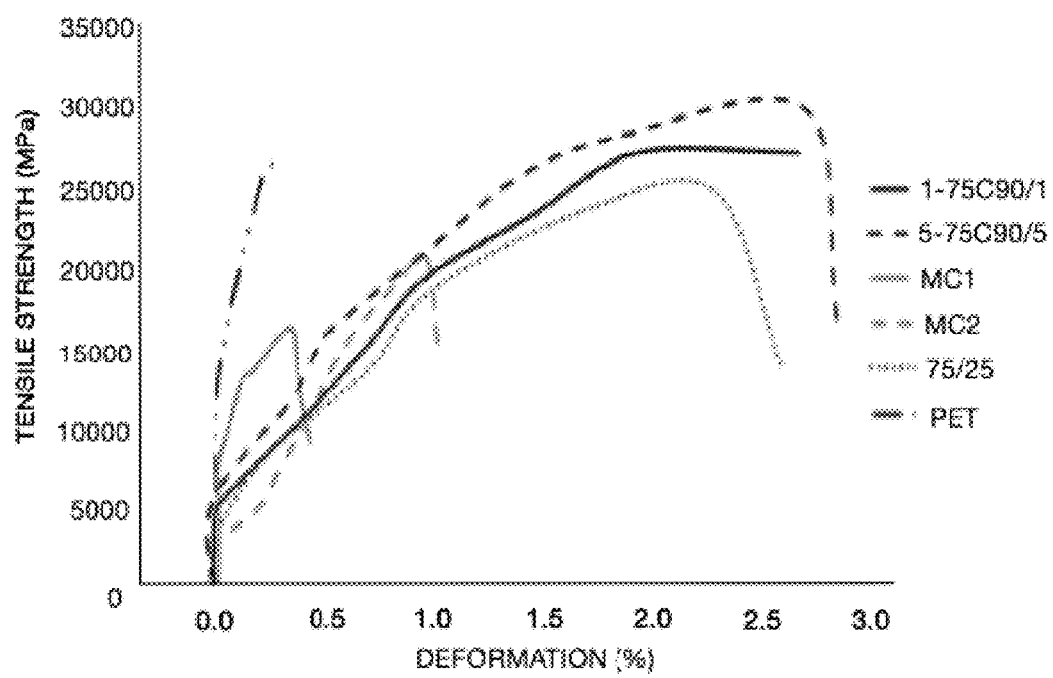
FIG. 11. shows a tensile strength behavior of: a) blends with PET matrix (75% w/w) and compatibilizer (with 90% w/w PAA) compared with: non-compatibilized blend, compatibilized with commercial material and pure PET, b) blends with PET matrix (75% w/w) and compatibilizer (with 70% w/w PAA) compared with: non-compatibilized blend, compatibilized with commercial material and pure PET, c) blends with LDPE matrix (75% w/w) and compatibilizer (with 90% w/w PAA) compared with: non-compatibilized blend, compatibilized with commercial material and pure LDPE, and d) blends with LDPE matrix (75% w/w) and compatibilizer (with 70% w/w PAA) compared with: non-compatibilized blend, compatibilized with commercial material and pure LDPE.

The mechanical properties of compatibilized and non-compatibilized blends were evaluated, according to ASTM D638 tests. FIG. 11 shows the results of tensile for blends with a continuous phase of PET (75% w/w). The blend without compatibilizer has a greater elongation at break compared to that for pure PET. This means that at low LDPE concentrations (25% w/w) in the PET matrix, an increase in the plasticity of the material takes place probably due to a plasticization effect by the LDPE. However, the components in the blend will tend to separate, with time, due to their incompatibility.

In the case of the compatibilized blends, 1-75C90/1 and 5-75C90/5, they showed higher elongation and tensile strength than non-compatibilized blends and that blends with commercial compatibilizer (MC1 and MC2). The highest elongation was obtained with the blend 5-75C90/5, which exhibited an elongation 24% greater than the blend without compatibilizer due to the high concentration of PAA in the compatibilizer. In this blend, the compatibilizer may act as a plasticizer and give more flexibility to the blend, along with a better interaction with PET. Thus, the tensile strength was improved. In addition, the toughness of the compatibilized blends with the synthesized IPN was higher than all the other samples, which is indicative of the better interaction between LDPE and PET, since better dispersion all along the PET matrix was achieved, as it will be shown later by electronic microscopy.

From FIG. 11-a, it can be seen that samples containing compatibilizer with 90% w/w of PAA exhibit a significant increase in the tensile strength, between 8.7 and 12.0% higher than the specimen non-compatibilized. Furthermore, it was observed that increasing the concentration of the compatibilizer in the blend gives better results due to the increase in the concentration of PAA in the blend which generates more secondary interactions with the PET, achieving better interfacial adhesion.

The blends made with compatibilizer that has lower PAA content, 3-75C70/1 and 7-75C70/5 shown in FIG. 11-b, exhibited lower elongation at break than those blends shown in FIG. 11-a, due to an increased stiffness of the material generated by the formation of domains between LDPE with SEPS, because they are chemically akin forming more dispersion like interactions between the compatibilizer and the blend but also the number of interaction between PAA and PET, by their functional groups, was reduced, then the plasticizer effect was slighter. The blend 3-75C70/1 (1% w/w IPN with 70% w/w PAA) had an increment of 5.9 times the Young's modulus in comparison to pure PET and 7.9 times higher than the blend without compatibilizer. This is associated to the dispersion type interactions between SEPS with LDPE, and additionally to the affinity between the aromatic groups of the PET, and those of the SEPS.

Blends with commercial compatibilizer (MC1 and MC2 samples), for this case of a continuous PET matrix, have a lower performance compared to the compatibilized blends with the designed and synthesized IPN, due to the greater number of functional groups in the PAA that can interact with PET, and compared with the small amount of MA (1% w/w) present in the commercial compatibilizer. Thus, the quantity of functional groups present in compatibilizer is important to improve the interfacial adhesion between the plastics to be blended. Also, it is important to have specific functional groups akin to both type of plastics, this was achieved with the instant invention's compatibilizer.

The FIG. 11-c shows the results of mechanical testing for the continuous LDPE matrix (75% w/w) blends, with and without compatibilizer, blends with commercial compatibilizer and pure LDPE. From such figure, it can be seen that all compatibilized blends exhibit higher elongation at break than the blend without compatibilizer. Also, all the compatibilized blends exhibited higher tensile strength and higher Young's Modulus than pure LDPE. The blends with commercial compatibilizer, MC3 and MC4, showed good performance because the commercial compatibilizer contains, at least, 99% w/w of PE, which has a natural chemical affinity for the LDPE continuous phase in the blend and the grafted maleic anhydride in the commercial compatibilizer was able to interact with the PET. Thus, elongation was increased as the commercial compatibilizer concentration was increased.

The blend with the present invention's compatibilizer, 6-25C90/5, showed the highest elongation at break (3.3 times the blend without compatibilizer). This is due to the good interaction between the components, particularly between the PAA and PET. The increase of the compatibilizer concentration to 5% w/w generated more interactions between these components resulting in an increased elongation at break compared to the blend with 1% w/w. Note that all blends had less elongation compared to pure LDPE sample, which was due to the presence of rigid material like PET in the blend. Furthermore, the LDPE has the ability to reorient polymer chains during the tensile stress, but in the case of blends with PET this property is limited.

The mechanical behavior for the blends obtained with IPN-based compatibilizer, which has just 70% w/w of PAA, is shown in FIG. 11-d. The addition of 25% w/w PET to the LDPE matrix leads to an increase in stiffness, which is reflected by an increment of the Young's modulus. The instant invention's IPN compatibilized blends have higher elastic modulus as opposed to the blend without compatibilizer.

Differential Scanning Calorimetry (DSC).

The calorimetric analysis was performed using a DSC Q200 equipment (TA instruments, USA). It was conducted an initial heating sweep of −80° C. to 280° C. with a rate of 10° C./min followed by cooling to 30° C. at the same rate and followed by a second cycle with the same conditions.

According to the results of thermal analysis, the interpenetrating polymer network (IPN) with two ratios of PAA/TPE (70/30 and 90/10% w/w), the glass transition temperature (Tg) for the thermoplastic elastomer (TPE) remains in both types of compatibilizer, such Tg was −58±1° C. However, for the case of PAA, there is a shift in Tg for both type of IPN (70/30 and 90/10% w/w PAA/TPE) of approximately 32° C. above with respect to the value corresponding to pure polymer.

Bearing in mind the Free-Volume Theory developed by Eyring, where the molecular motion in the bulk state depends on the presence of holes, or places where there are vacancies or voids. Then, the PAA has fewer empty spaces due to the presence of TPE, and the movement of the PAA polymer segments is restricted and the Tg increases. The change of Tg is reflected only in the PAA due to the molecular weight difference (Mn) between both polymers, while the molecular weight of PAA is about 20,000 g/mol and the molecular weight of TPE is about 150,000 g/mol. Therefore, the PAA mobility in the IPN is limited due to the presence of the TPE which is much more voluminous and have longer polymeric chains.

The percentage of crystallinity ($\chi_c$) for LDPE and PET was calculated with the following equation:

$$\chi_C(\text{wt \%}) = 100 \times \frac{\Delta H_m}{\Delta H_m^\circ}$$

Where $\Delta H°_m$ for crystalline PET is 119.8 J/g and $\Delta H°_m$ for LDPE is 293.0 J/g.

At a heating rate of 10° C./min, the PET exhibited a melting temperature ($T_m$) of 242.6° C. and for LDPE the melt temperature was detected at 110.2° C. The melting temperatures for blends 75/25 and 25/75% w/w (PET/LDPE) without compatibilizer were very close to the $T_m$ of the pure components, i.e. no significant changes due to the incompatibility of components. Table 6 shows the values of the melting temperatures ($T_m$), the melting enthalpy ($\Delta H_m$) and the percentage of crystallinity ($\chi_c$) of blends with continuous phase of PET, with and without compatibilizer, as well as components blends.

TABLE 6

Thermal properties of the blends PET/LDPE (75/25% w/w) with and without compatibilizer

| | LDPE | | | PET | | |
|---|---|---|---|---|---|---|
| Blends | $T_m$ ° C. | $\Delta H_m$ J/(g · ° C.) | % crystallinity | $T_m$ ° C. | $\Delta H_m$ J/(g · ° C.) | % crystallinity |
| PET | — | — | — | 242.6 | 34.0 | 28.4 |
| LDPE | 110.2 | 109.7 | 37.4 | — | — | — |
| 75/25 | 109.4 | 16.8 | 5.7 | 243.0 | 25.5 | 21.3 |
| 1-75C90/1 | 108.9 | 55.1 | 18.8 | 243.8 | 40.3 | 33.7 |
| 5-75C90/5 | 108.4 | 30.6 | 10.4 | 242.4 | 24.9 | 20.8 |
| 3-75C70/1 | 109.1 | 48.6 | 16.6 | 243.2 | 32.6 | 27.2 |
| 7-75C70/5 | 108.4 | 25.8 | 8.8 | 242.7 | 25.6 | 21.4 |

The blend 3-75C70/1 has two $T_m$ due to its two components, LDPE and PET. The $T_m$ of LDPE, decreased 1° C. by the addition of compatibilizer and exhibits another melting transition at 118.6° C. which may represent a change in the regular structure of blend due to the compatibilizer presence, which could act like a nucleation agent. The $T_m$ of PET in the blend, did not change significantly. Furthermore, the blend 7 (75/25 w/w PET/LDPE) with 5% w/w of compatibilizer (70/10% w/w PAA/TPE) shows that the $T_m$ and melting enthalpy ($\Delta H_m$) of the LDPE slightly decreased, as a consequence of interactions between the PET and LDPE.

The crystallinity of the LDPE phase was increased with the addition of 1% w/w of compatibilizer for both types of IPNs, however the addition of compatibilizer most significantly causes a reduction in the crystallinity of LDPE. The behavior for the continuous phase $\chi_c$ of PET, which may be affected by the presence of the compatibilizer and the content of functional groups resulting in reduced mobility of the chains, are similar. The formation of copolymer (due to trans-esterification reactions) reduces the flexibility of the chain, and stereoregularity destroys symmetry and ultimately decreases the crystallinity of PET. Additionally, there was a decrement of the size of the dispersed particles of LDPE, and the compatibilizing effect in the crystallization of PET becomes more pronounced. The $\Delta H_m$ in all compatibilized blends were modified, regarding the non-compatibilized blends, by the presence of the compatibilizer as a result of suitable interaction with the two polymers in the blend.

Similar behavior is observed for the case of the continuous PET phase where $T_m$ and $\Delta H_m$ decreased due to the increased concentration of compatibilizer, which is due to the effect of the compatibilizer that is miscible with LDPE phase and exhibits chemical reactions with the functional groups of the groups of the PET chain. The same behavior was observed for mixtures 1-75C90/1 and 5-75C90/5.

For blends with LDPE matrix, the observed $T_m$ for the two components that form the polymer blend, are presented in Table 7.

TABLE 7

Thermal properties of PET/LDPE blends (25/75% w/w) with and without compatibilizer.

| | LDPE | | | PET | | |
|---|---|---|---|---|---|---|
| Blends | $T_m$ ° C. | $\Delta H_m$ J/g | % crystallinity | $T_m$ ° C. | $\Delta H_m$ J/g | % Crystallinity |
| PET | | | | 242.6 | 34.0 | 28.4 |
| LDPE | 110.2 | 109.7 | 37.4 | | | |
| 25/75 | 109.9 | 81.6 | 27.9 | 241.6 | 8.5 | 7.1 |

TABLE 7-continued

Thermal properties of PET/LDPE blends (25/75% w/w) with and without compatibilizer.

| Blends | LDPE | | | PET | | |
|---|---|---|---|---|---|---|
| | $T_m$ °C. | $\Delta H_m$ J/g | % crystallinity | $T_m$ °C. | $\Delta H_m$ J/g | % Crystallinity |
| 2-25C90/1 | 109.4 | 109.4 | 37.3 | 242.3 | 10.5 | 8.8 |
| 6-25C90/5 | 108.8 | 84.2 | 28.7 | 240.8 | 7.2 | 6.1 |
| 4-25C70/1 | 110.4 | 118.5 | 40.4 | 243.2 | 12.1 | 10.1 |
| 8-25C70/5 | 108.6 | 80.0 | 27.3 | 240.4 | 9.0 | 7.5 |

The melting enthalpy ($\Delta H_m$) and the percentage of crystallinity ($\chi_c$) for the LDPE decreased when PET is added to the blend without compatibilizer, but with the addition of 1% w/w of compatibilizer, either with 70 or 90% w/w PAA, the crystallinity was increased up to and higher than the percentage of the pure LDPE. The crystallinity of LDPE increased because the compatibilizer may be acting as a nucleating agent facilitating the crystallization of LDPE.

On the other hand, when it was increased the concentration of compatibilizer to 5% w/w there was a decrement in the percentage of crystallinity of the matrix. This is because there was a greater amount of IPN that interacts at the interface of the blend, which decreases the degree of perfection of the crystals of LDPE.

Another indication of the compatibility of the polymer mixture by action of the IPN compatibilizer is the presence of double melting peaks, when the mass of the crystallizable polymer is dispersed into small particles by action of the compatibilizer in an immiscible matrix then it is generated a fractional crystallization phenomena.

Morphological Analysis

Scanning Electron Microscopy (SEM).

Morphological analysis of the compatibilized blends, without compatibilizer and pure samples were analyzed by SEM, using the FEI Environmental Scanning microscope-QUANTA 200 (FEI Company, USA). Previous to analysis, the samples were submerged in liquid nitrogen and then fractured. The fracture surfaces were fixed in an aluminum pin and covered with gold nanoparticles. The secondary electron detector to observe the interface in the blends was used.

In order to determine the particle diameter of the dispersed phase, between 50 and 100 particles were considered. The number average ($D_n$) and weight average diameters ($D_w$) and polydispersity index (PDI) were determined using the following equations:

$$D_n = \frac{\sum N_i D_i}{\sum N_i}$$

$$D_w = \frac{\sum N_i D_i x}{\sum N_i D_i}$$

$$PDI = D_w / D_n$$

Figure 12:
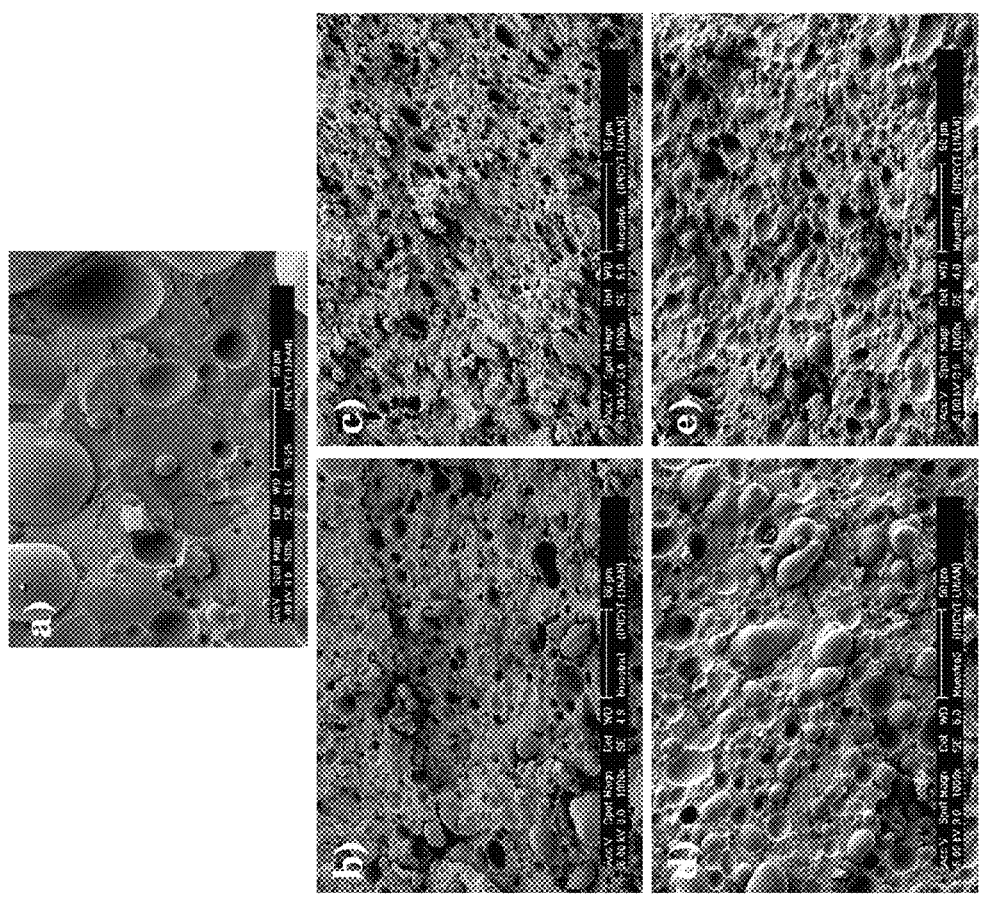
FIG. 12. shows micrographs at 1000× magnification: a) Blend 75/25 (PET/LDPE) without compatibilizer, b) compatibilized blend: 1-75C90/1, c) compatibilized blend: 5-75C90/5, d) compatibilized blend: 3-75C70/1, e) compatibilized blend: 7-75C70/5.

FIG. 12 shows the micrographs representative for the blends with the continuous phase of PET and dispersed phase of LDPE, with and without compatibilizer.

As it can be seen in the image corresponding to the specimen without compatibilizer (FIG. 12-a) the interaction of the matrix with the dispersed phase is minimal. The average particle size is 29 μm, and has low interfacial adhesion. The large particle size and lack of adhesion between the matrix and the dispersed phase, confirms the incompatibility of the components. In the next image corresponding to FIG. 12-b) when the blend is added with 1% w/w of compatibilizer with a PAA/TPE ratio of 90/10% w/w, it shows a clear decrease in particle size of up to 7 μm of the dispersed phase in the matrix of PET, which is due to a better interaction between the blend components. Thus, a small amount of compatibilizer is sufficient to obtain a substantial decrease in average particle size. The image of FIG. 12-c) of the compatibilized blend with 5% w/w of compatibilizer, it is clearly observed the LDPE particles dispersed inside the matrix of PET, which have an improved interfacial adhesion with respect to the non-compatibilized blend. However, the average size of the domain of LDPE was 12 μm, a size which is greater than that observed in the blend with 1% w/w compatibilizer, which, according to mechanical and thermal tests shows to be an adequate amount to improve continuity of the blend. For the next two images of FIGS. 12, 12-d) and 12-e), with 1 and 5% w/w of IPN-based compatibilizer (PAA/TPE ratio of 70/30% w/w), the average particle size was 10 and 8 μm respectively, it means that particle size decreases as higher amount of compatibilizer is added. However, the average diameter is greater than that obtained with the IPN-based compatibilizer having a PAA/TPE ratio of 90/10, with only 1% w/w of this present in the blend, which shows that for the blends with the PET matrix, the interactions are greater when there is more of PAA in the IPN.

Figure 13:
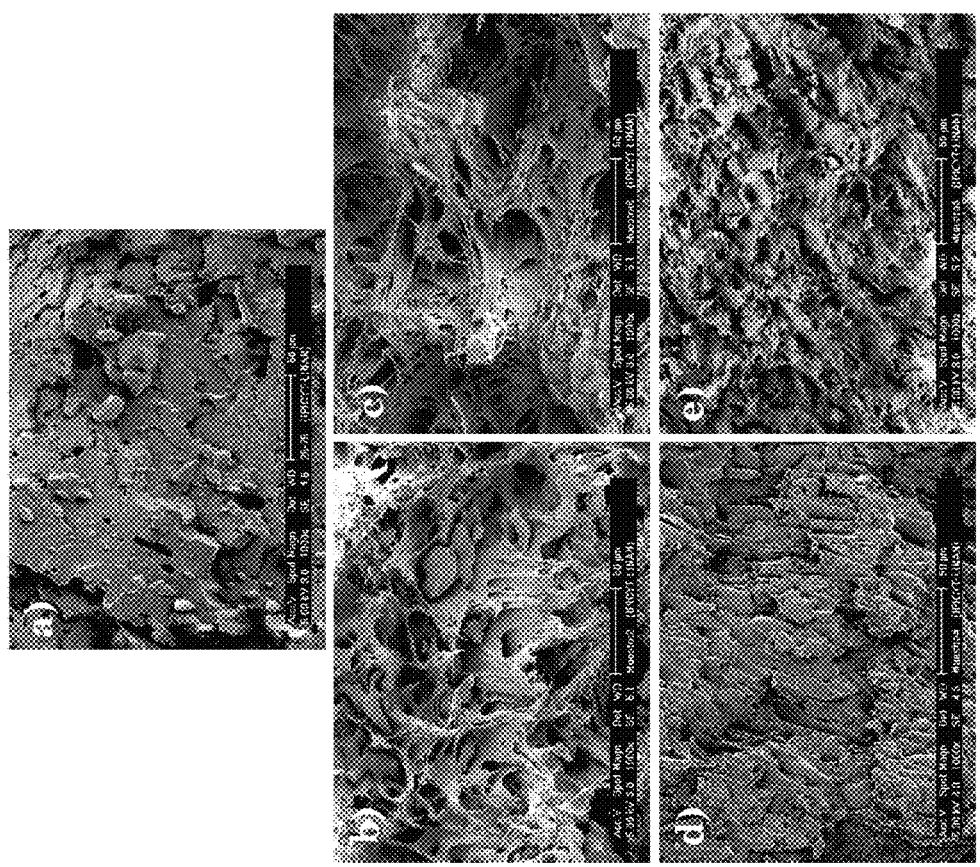
FIG. 13. shows micrographs at 1000× magnification: a) Blend 25/75 (PET/LDPE) without compatibilizer, b) compatibilized blend: 2-25C90/1, c) compatibilized blend: 6-25C90/5, d) compatibilized blend: 4-25C70/1, e) compatibilized blend: 8-25C70/5.

Furthermore, FIG. 13 shows the micrographs of the blends with LDPE continuous phase with and without compatibilizer. In FIG. 13-a, corresponding to the blend without compatibilizer, a clear vitreous break occurs due to low interfacial interaction between the polymers of the blend, conforming poor compatibility of the dispersed phase of PET in the matrix of LDPE. In contrast, the compatibilized blends with 1 and 5% w/w of compatibilizer (PAA/TPE ratio of 90/10% w/w) are shown in the images 13-b and 13-c exhibiting a marked change in the morphology surface, which is more homogeneous and non spherical component is appreciated but a fibrous type morphology is obtained. This can be related with mechanical behavior, in fact, for these blends higher tensile strength are obtained due to plastic behavior by the addition of the compatibilizer.

By comparing the images of the compatibilized blends with the IPN with 90 and 70% w/w of PAA, it is confirmed that at higher amount of PAA in the compatibilizer is possible to have a plasticization effect. In addition, the concentration increment of compatibilizer in the blend gives a higher melting between dispersed and continuous phases. Moreover, the images of FIGS. 13-d and 13-e, corresponding to compatibilizer with 70% w/w of PAA, showed a more rigid structure less fibrous type. In fact, when increasing the concentration of the compatibilizer it is showed great improvement on the morphology of the phases as well as a marked reduction in interfacial tension in comparison with the non-compatibilized blend containing only 1% w/w IPN (FIG. 13-d), this confirms the favorable effect of the compatibilizer in the blend. The PET exhibits good dispersion in the phase LDPE matrix, due to the particle sizes are smaller. The reduction in particle size dispersed in the presence of compatibilizer is related to the decrease of interfacial tension and coalescence suppression, which depend on the amount of compatibilizer in the blend.

In light of the above, the present invention shows a method for synthesizing a compatibilizer based on interpenetrating polymer network (IPN), which allowed having a great number of functional groups, because the chemical nature of the component and adequate affinity to polyester and polyolefin like PET, PP and/or LDPE.

The compatibilizer in an IPN form can act as plasticizer into the blend of PET and LDPE, modifying the mechanical behavior, giving materials with high elongation at break. In general, the tensile strength of the blends with the IPN-based compatibilizer was higher than those obtained with commercial compatibilizer.

The instant invention's compatibilizer has a significant effect on the morphology of polymer blends improving the interfacial adhesion, reducing of the average particle size of the dispersed phase and avoiding of coalescence.

The invention claimed is:

1. A compatibilizer for recycling plastics comprising:
   a thermoplastic elastomer selected from the group consisting of: Styrene-butadiene-styrene (SBS), Styrene-ethylene-butadiene-styrene (SEBS), Ethylene propylene rubber (EPR), ethylene-butadiene (EB), Styrene-ethylene-propylene-styrene (SE PS), or mixtures thereof; and
   an acrylic polymer selected from the group consisting of: Polyacrylate emulsion, poly (butyl acrylate), polyacrylamide, poly (methyl methacrylate), poly (butyl acrylate), poly methacrylamide, poly (N-methyl acrylamide), poly (N-ethyl acrylamide), poly (n-propyl acrylamide), poly (n-octyl acrylamide), poly(N,N-diethylacrylamide), poly (N,N-diethyl methacrylamide), polyacrylonitrile, poly (methacrylic acid), poly (crotonic acid), poly (sorbic acid), poly (glutonic acid), poly (β-styryl acrylic acid) or poly (acrylic acid) (PAA), or mixtures thereof,
   wherein said thermoplastic elastomer and said acrylic polymer form an interpenetrating polymeric network and are able to compatibilize recycled plastics; and
   wherein said thermoplastic elastomer is in an amount of 10 to 30% w/w.

2. The compatibilizer of claim 1, wherein said acrylic polymer is poly(acrylic acid).

3. The compatibilizer of claim 1, wherein said acrylic polymer is in an amount of 70 to 90% w/w.

4. A compatibilizer for recycling plastics comprising:
   a styrene-ethylene-propylene-styrene as a thermoplastic elastomer; and
   an acrylic polymer selected from the group consisting of: Polyacrylate emulsion, poly (butyl acrylate), polyacrylamide, poly (methyl methacrylate), poly (butyl acrylate), poly methacrylamide, poly (N-methyl acrylamide), poly (N-ethyl acrylamide), poly (n-propyl acrylamide), poly (n-octyl acrylamide), poly(N,N-diethylacrylamide), poly (N,N-diethyl methacrylamide), polyacrylonitrile, poly (methacrylic acid), poly (crotonic acid), poly (sorbic acid), poly (glutonic acid), poly (β-styryl acrylic acid) or poly (acrylic acid) (PAA), or mixtures thereof,
   wherein said thermoplastic elastomer and said acrylic polymer form an interpenetrating polymeric network and are able to compatibilize recycled plastics.

5. A polymer mixture comprising:
   a) a compatibilizer including:
   a thermoplastic elastomer selected from the group consisting of: Styrene-butadiene-styrene (SBS), Styrene-ethylene-butadiene-styrene (SEBS), Ethylene propylene rubber (EPR), ethylene-butadiene (EB), Styrene-ethylene-propylene-styrene (SE PS), or mixtures thereof; and
   an acrylic polymer selected from the group consisting of: Polyacrylate emulsion, poly (butyl acrylate), polyacrylamide, poly (methyl methacrylate), poly (butyl acrylate), poly methacrylamide, poly (N-methyl acrylamide), poly (N-ethyl acrylamide), poly (n-propyl acrylamide), poly (n-octyl acrylamide), poly(N,N-diethylacrylamide), poly (N,N-diethyl methacrylamide), polyacrylonitrile, poly (methacrylic acid), poly (crotonic acid), poly (sorbic acid), poly (glutonic acid), poly (β-styryl acrylic acid) or poly (acrylic acid) (PAA), or mixtures thereof, wherein said thermoplastic elastomer and said acrylic polymer form an interpenetrating polymeric network and are able to compatibilize recycled plastics; and
   b) at least one recyclable plastic polymer selected from the group consisting of polyolefins and poly(ethylene terephthalate).

6. The polymer mixture of claim 5, wherein said compatibilizer is in the range 0.2 to 5% w/w of the total amount of the plastic.

* * * * *